(12) United States Patent
Furuhata et al.

(10) Patent No.: US 10,969,224 B2
(45) Date of Patent: Apr. 6, 2021

(54) PHYSICAL QUANTITY SENSOR, PHYSICAL QUANTITY SENSOR DEVICE, COMPOSITE SENSOR DEVICE, INERTIA MEASUREMENT DEVICE, VEHICLE POSITIONING DEVICE, PORTABLE ELECTRONIC DEVICE, ELECTRONIC APPARATUS, VEHICLE, AND OUTPUT SIGNAL ADJUSTMENT METHOD OF PHYSICAL QUANTITY SENSOR

(71) Applicant: Seiko Epson Corporation, Tokyo (JP)

(72) Inventors: Makoto Furuhata, Matsumoto (JP); Hajime Tomiyama, Fujimi (JP)

(73) Assignee: Seiko Epson Corporation

( * ) Notice: Subject to any disclaimer, the term of this patent is extended or adjusted under 35 U.S.C. 154(b) by 245 days.

(21) Appl. No.: 16/261,969

(22) Filed: Jan. 30, 2019

(65) Prior Publication Data
US 2019/0234734 A1    Aug. 1, 2019

(30) Foreign Application Priority Data

Jan. 31, 2018 (JP) .............................. JP2018-014735

(51) Int. Cl.
*G01C 19/56* (2012.01)
*G01C 19/5649* (2012.01)

(52) U.S. Cl.
CPC ................................ *G01C 19/5649* (2013.01)

(58) Field of Classification Search
CPC ............ G01C 19/5649; G01C 19/5747; G01C 19/56; G01C 19/5642

USPC ............... 73/514.02, 514.01, 514.12, 504.15
See application file for complete search history.

(56) References Cited

U.S. PATENT DOCUMENTS

| 5,501,893 | A | 3/1996 | Laermer et al. |
| 6,571,630 | B1 | 6/2003 | Weinberg et al. |
| 7,213,458 | B2 | 5/2007 | Weber et al. |
| 9,476,905 | B2 * | 10/2016 | Takagi ................. B81B 3/0008 |

FOREIGN PATENT DOCUMENTS

| JP | H07-503815 A | 4/1995 |
| JP | 2009-175079 A | 8/2009 |

* cited by examiner

*Primary Examiner* — Tarun Sinha
(74) *Attorney, Agent, or Firm* — Harness, Dickey & Pierce, P.L.C.

(57) ABSTRACT

A physical quantity sensor includes a movable body and first and second detection electrodes facing the movable body with a separation distance between the movable body and the second detection electrode that is different from that between the movable body and the first detection electrode. The movable body and the first detection electrode are aligned to face one another in a first direction. Vibration of the movable body includes a drive vibration mode in which vibration in the first direction and vibration in a second direction orthogonal to the first direction are combined. To account for this drive vibration mode, an area of the second detection electrode is shifted to be greater in the second direction from its center in a plan view.

20 Claims, 27 Drawing Sheets

PHYSICAL QUANTITY SENSOR, PHYSICAL QUANTITY SENSOR DEVICE, COMPOSITE SENSOR DEVICE, INERTIA MEASUREMENT DEVICE, VEHICLE POSITIONING DEVICE, PORTABLE ELECTRONIC DEVICE, ELECTRONIC APPARATUS, VEHICLE, AND OUTPUT SIGNAL ADJUSTMENT METHOD OF PHYSICAL QUANTITY SENSOR

BACKGROUND

1. Technical Field

The present invention relates to a physical quantity sensor, a physical quantity sensor device, a composite sensor device, an inertia measurement device, a vehicle positioning device, a portable electronic device, an electronic apparatus, a vehicle, and an output signal adjustment method of the physical quantity sensor.

2. Related Art

An angular velocity sensor described in JP-A-2009-175079 includes a movable drive electrode, a fixed drive electrode for vibrating the movable drive electrode, a movable detection electrode connected to the movable drive electrode via a vibration amount amplification portion, and a fixed detection electrode disposed so as to face the movable detection electrode. In such an angular velocity sensor, an electrostatic attraction force is generated between the movable drive electrode and the fixed drive electrode to vibrate the movable detection electrode together with the movable drive electrode in the Y-axis direction (this vibration mode is referred to as "drive vibration mode"). In this state, when an angular velocity around the X-axis is applied, the movable detection electrode vibrates in the Z-axis direction (this vibration mode is referred to as a "detection vibration mode") by the Coriolis force, and an angular velocity around the X-axis can be detected based on an electrostatic capacitance between the movable detection electrode and the fixed detection electrode, which changes accompanying the vibration.

Such an angular velocity sensor can be formed, for example, by using a deep groove etching technique (Bosch process) of silicon described in JP-T-7-503815. The deep groove etching technique of silicon is a technique of forming a deep groove (through-hole) in silicon by alternately switching between two systems of gases $SF_6$ (etching gas) and $C_4F_8$ (side wall protective film forming gas) and alternately repeating an etching process and a side wall protective film forming process. According to such a deep groove etching technique, it is possible to form a groove that is excellent in verticality of a groove side surface and having a high aspect ratio.

However, in the case of using the deep groove etching technique described in JP-T-7-503815, a through-hole may be formed in an oblique direction inclined with respect to the normal direction of an etched surface of an etched wafer, for example, depending on a position of the etched wafer in a chamber or the like. As such, when the through-hole is obliquely formed, a cross sectional shape of the vibration amount amplification portion is deviated from a rectangle (for example, the cross sectional shape becomes a parallelogram shape), and the movable detection electrode moves in the Y-axis direction as well as in the Z-axis direction in the drive vibration mode, and the detection characteristics of the angular velocity are deteriorated. The vibration (unnecessary vibration) of the movable detection electrode in the Z-axis direction in the drive vibration mode is also called a "quadrature", and a noise signal caused by the quadrature is also called a "quadrature signal".

SUMMARY

An advantage of some aspects of the invention is to provide a physical quantity sensor, a physical quantity sensor device, a composite sensor device, an inertia measurement device, a vehicle positioning device, a portable electronic device, an electronic apparatus, a vehicle, and an output signal adjustment method of the physical quantity sensor.

The invention can be implemented as the following configurations.

A physical quantity sensor according to an aspect of the invention includes a movable body, and a detection electrode which includes a first detection electrode disposed so as to face the movable body and a second detection electrode disposed so as to face the movable body and having a separation distance between the movable body and the second detection electrode different from a separation distance between the movable body and the first detection electrode, in which when a direction in which the movable body and the first detection electrode are aligned is set as a first direction and a direction orthogonal to the first direction is set as a second direction, vibration of the movable body has a drive vibration mode in which vibration in the first direction and vibration in the second direction are combined, the second detection electrode is disposed so as to be deviated in the second direction from the center of the detection electrode in the second direction in a plan view in the first direction.

With this configuration, it is possible to obtain a physical quantity sensor capable of reducing deterioration of detection characteristics of the physical quantity by the quadrature.

In the physical quantity sensor according to the aspect of the invention, it is preferable that a first state in which the first detection electrode and the second detection electrode are electrically connected to each other and a second state in which the first detection electrode and the second detection electrode are not electrically connected is selectable.

With this configuration, a quadrature signal can be reduced more effectively.

In the physical quantity sensor according to the aspect of the invention, it is preferable that the second detection electrode and the movable body are electrically connected in the second state.

With this configuration, the second detection electrode and the movable body have the same potential, an unintended electrostatic attraction force is not generated between the second detection electrode and the movable body, so that the movable body can be stably vibrated. As a result, detection accuracy of the physical quantity is stabilized.

In the physical quantity sensor according to the aspect of the invention, it is preferable that when a direction orthogonal to the first direction and the second direction is set as a third direction, the second detection electrode has an elongated shape along the third direction.

With this configuration, the quadrature signal can be reduced more effectively.

In the physical quantity sensor according to the aspect of the invention, it is preferable that the detection electrode includes a plurality of the second detection electrodes.

With this configuration, the quadrature signal can be reduced more effectively.

In the physical quantity sensor according to the aspect of the invention, it is preferable that the plurality of second detection electrodes are positioned on both sides in the second direction with respect to a center of the detection electrode in the second direction in a plan view in the first direction.

With this configuration, the quadrature signal can be reduced more effectively.

In the physical quantity sensor according to the aspect of the invention, it is preferable that a substrate disposed so as to face the movable body is included, the substrate has a principal surface which faces the movable body and a concave portion which is open to the principal surface, and the first detection electrode is disposed on the principal surface and the second detection electrode is disposed on an inner bottom surface of the concave portion.

With this configuration, a separation distance between the movable body and the first detection electrode and a separation distance between the movable body and the second detection electrode can be made different from each other with a simple configuration.

In the physical quantity sensor according to the aspect of the invention, it is preferable that a substrate disposed so as to face the movable body is included, the substrate has a principal surface facing the movable body and a convex portion provided on the principal surface, and the first detection electrode is disposed on the principal surface and the second detection electrode is disposed on a top surface of the convex portion.

With this configuration, the separation distance between the movable body and the first detection electrode and the separation distance between the movable body and the second detection electrode can be made different from each other with a simple configuration.

In the physical quantity sensor according to the aspect of the invention, it is preferable that when a direction orthogonal to the first direction and the second direction is set as a third direction, an angular velocity around a detection axis along the third direction is detectable.

With this configuration, a physical quantity sensor with high convenience is obtained.

A physical quantity sensor device according to another aspect of the invention includes the physical quantity sensor according to the aspect of the invention and a circuit element.

With this configuration, it is possible to obtain the effect of the physical quantity sensor, and a physical quantity sensor device with high reliability.

A composite sensor device according to another aspect of the invention includes a first physical quantity sensor which is the physical quantity sensor according to the aspect of the invention and a second physical quantity sensor that detects a physical quantity different from that of the first physical quantity sensor.

With this configuration, it is possible to obtain the effect of the physical quantity sensor, and a composite sensor device with high reliability.

In the composite sensor device according to the aspect of the invention, it is preferable that the first physical quantity sensor is a sensor which can measure an angular velocity, and the second physical quantity sensor is a sensor which can measure acceleration.

With this configuration, a composite sensor device with high convenience is obtained.

An inertia measurement device according to another aspect of the invention includes the physical quantity sensor according to the aspect of the invention, and a control circuit that controls drive of the physical quantity sensor.

With this configuration, it is possible to obtain the effect of the physical quantity sensor and an inertia measurement device with high reliability.

A vehicle positioning device according to another aspect of the invention includes the inertia measurement device according to the aspect of the invention, a reception unit that receives a satellite signal on which position information is superimposed from a positioning satellite, an acquisition unit that acquires position information of the reception unit based on the received satellite signal, a computation unit that computes an attitude of a vehicle based on inertia data output from the inertia measurement device, and a calculation unit that calculates a position of the vehicle by correcting the position information based on the calculated attitude.

With this configuration, it is possible to obtain the effect of the inertia measurement device and a vehicle positioning device with high reliability.

A portable electronic device according to another aspect of the invention includes the physical quantity sensor according to the aspect of the invention, a case that accommodates the physical quantity sensor, a processing unit accommodated in the case and processing output data from the physical quantity sensor, a display unit accommodated in the case, and a translucent cover that covers an opening of the case.

With this configuration, it is possible to obtain the effect of the physical quantity sensor and to obtain a portable electronic device with high reliability.

In the portable electronic device according to the aspect of the invention, it is preferable to include a satellite positioning system and to measure a moving distance and a movement trajectory of a user.

With this configuration, convenience of the portable electronic device is improved.

An electronic apparatus according to another aspect of the invention includes the physical quantity sensor according to the aspect of the invention, and a control unit that performs control based on a detection signal output from the physical quantity sensor.

With this configuration, it is possible to obtain the effect of the physical quantity sensor and to obtain an electronic apparatus with high reliability.

A vehicle according to another aspect of the invention includes the physical quantity sensor according to the aspect of the invention, and a control unit that performs control based on a detection signal output from the physical quantity sensor.

With this configuration, it is possible to obtain the effect of the physical quantity sensor and to obtain a vehicle with high reliability.

In the vehicle according to the aspect of the invention, it is preferable that at least one of an engine system, a brake system, and a keyless entry system is included and the control unit controls the system based on the detection signal.

With this configuration, it is possible to control the system with high accuracy.

An output signal adjustment method according to another aspect of the invention is an output signal adjustment method of a physical quantity sensor which includes a movable body, and a detection electrode which includes a first detection electrode disposed to face the movable body and a second detection electrode disposed to face the movable body and having a separation distance between the movable body and the second detection electrode different from a separation distance between the movable body and the first detection electrode are included, and in which when a direction in which the movable body and the first detection electrode are aligned is set as a first direction and a direction orthogonal to the first direction is set as a second direction, vibration of the movable body has a drive vibration mode in which vibration in the first direction and vibration in the second direction are combined, the second detection electrode is disposed so as to be deviated in the second direction from a center of the detection electrode in the second direction in a plan view in the first direction. The method includes adjusting an output signal by changing an inclination of the detection electrode with respect to the second direction in a pseudo manner by selecting one of a first state in which the first detection electrode and the second detection electrode are electrically connected to each other and a second state in which the first detection electrode and the second detection electrode are not electrically connected.

With this configuration, it is possible to obtain a physical quantity sensor capable of reducing deterioration of the detection characteristics of the physical quantity by the quadrature.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a physical quantity sensor, a physical quantity sensor device, a composite sensor device, an inertia measurement device, a vehicle positioning device, a portable electronic device, an electronic apparatus, a vehicle, and an output signal adjustment method of the physical quantity sensor according to the invention will be described in detail based on embodiments illustrated in the accompanying drawings.

First Embodiment

First, a physical quantity sensor and an output signal adjustment method of the physical quantity sensor according to the first embodiment of the invention will be described.

Figure 1:
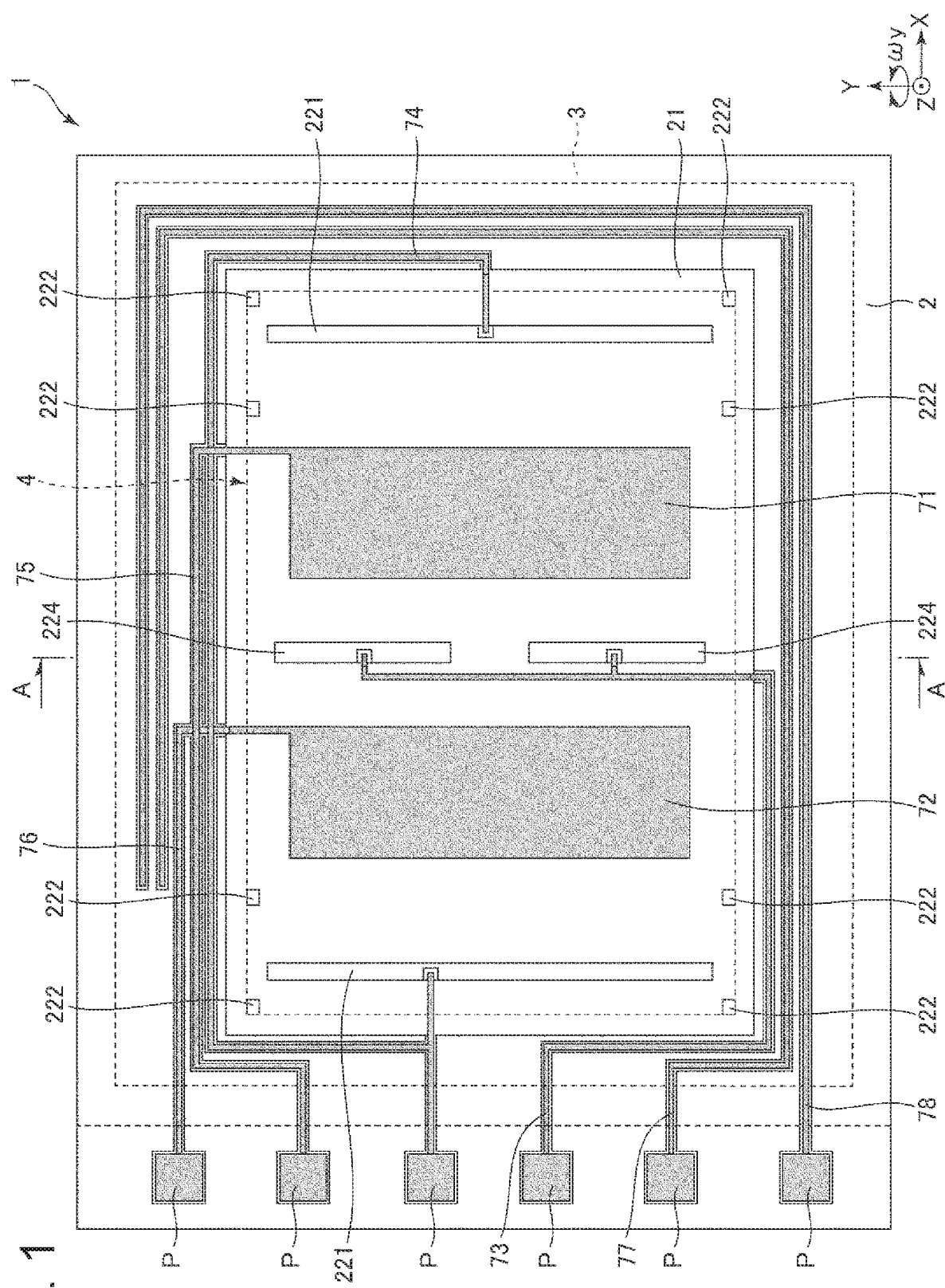
FIG. 1 is a plan view illustrating a physical quantity sensor according to a first embodiment of the invention.
Figure 2:
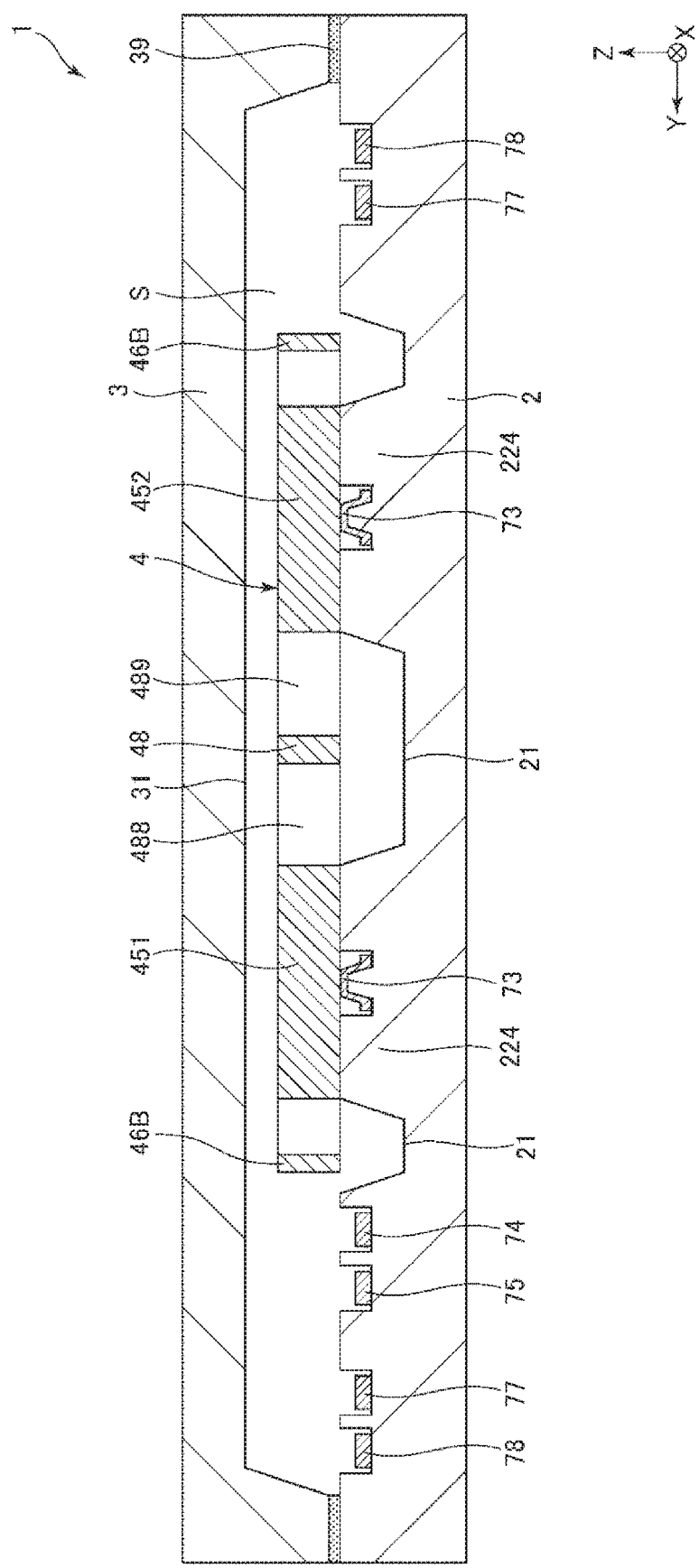
FIG. 2 is a cross-sectional view taken along line A-A in FIG. 1.
Figure 3:
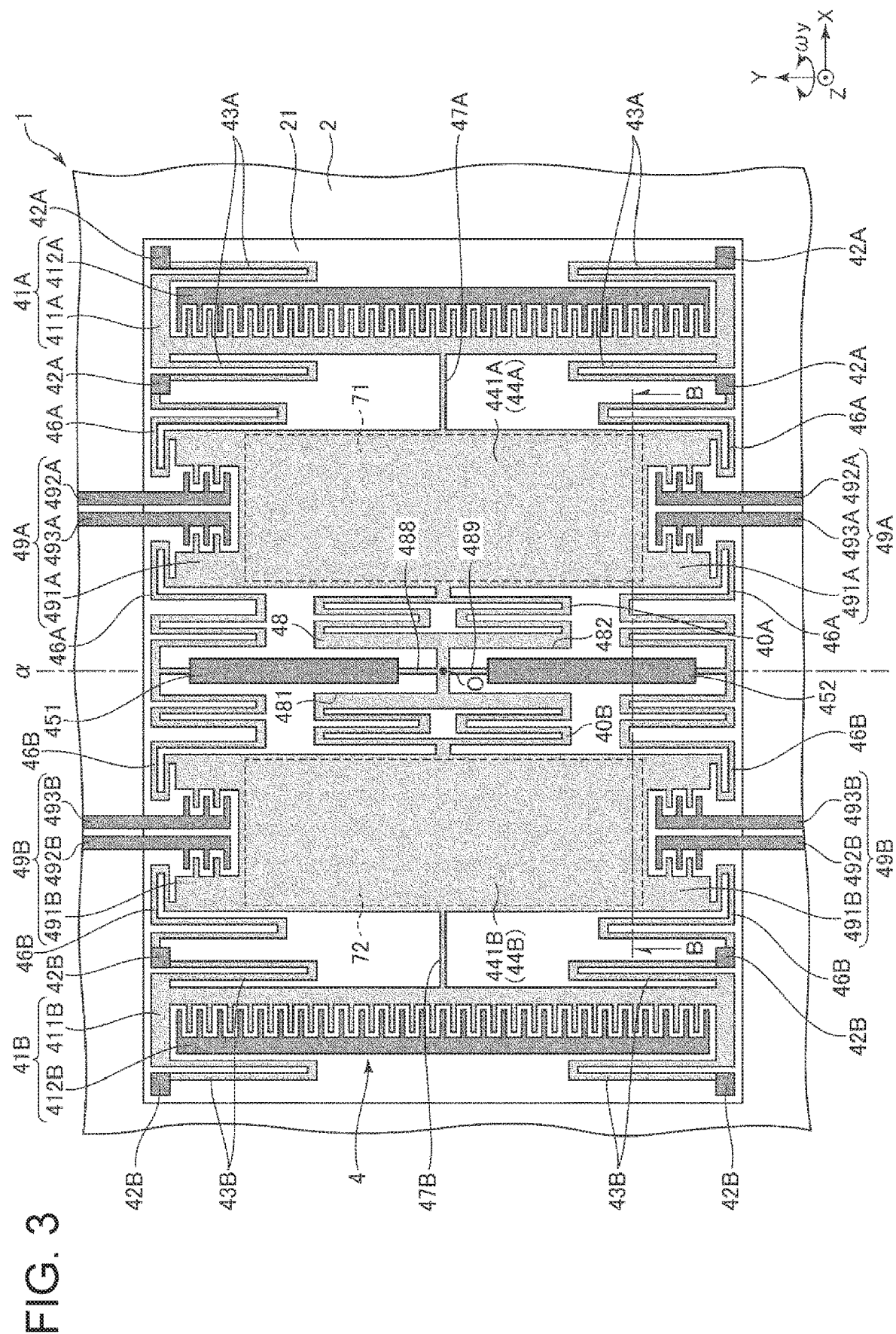
FIG. 3 is a plan view illustrating a sensor element included in the physical quantity sensor of FIG. 1.
Figure 4:
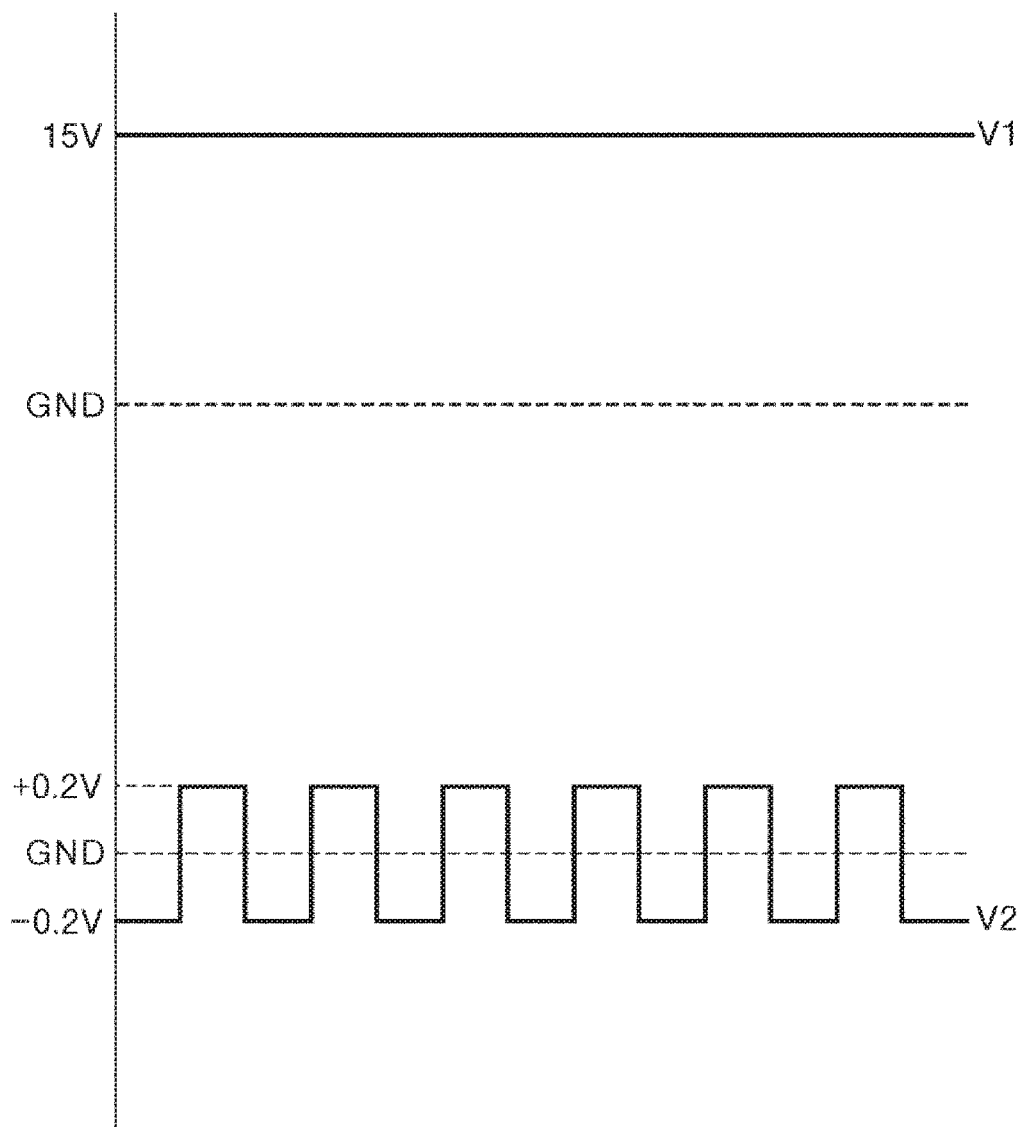
FIG. 4 is a diagram illustrating a voltage to be applied to the physical quantity sensor of FIG. 1.
Figure 5:
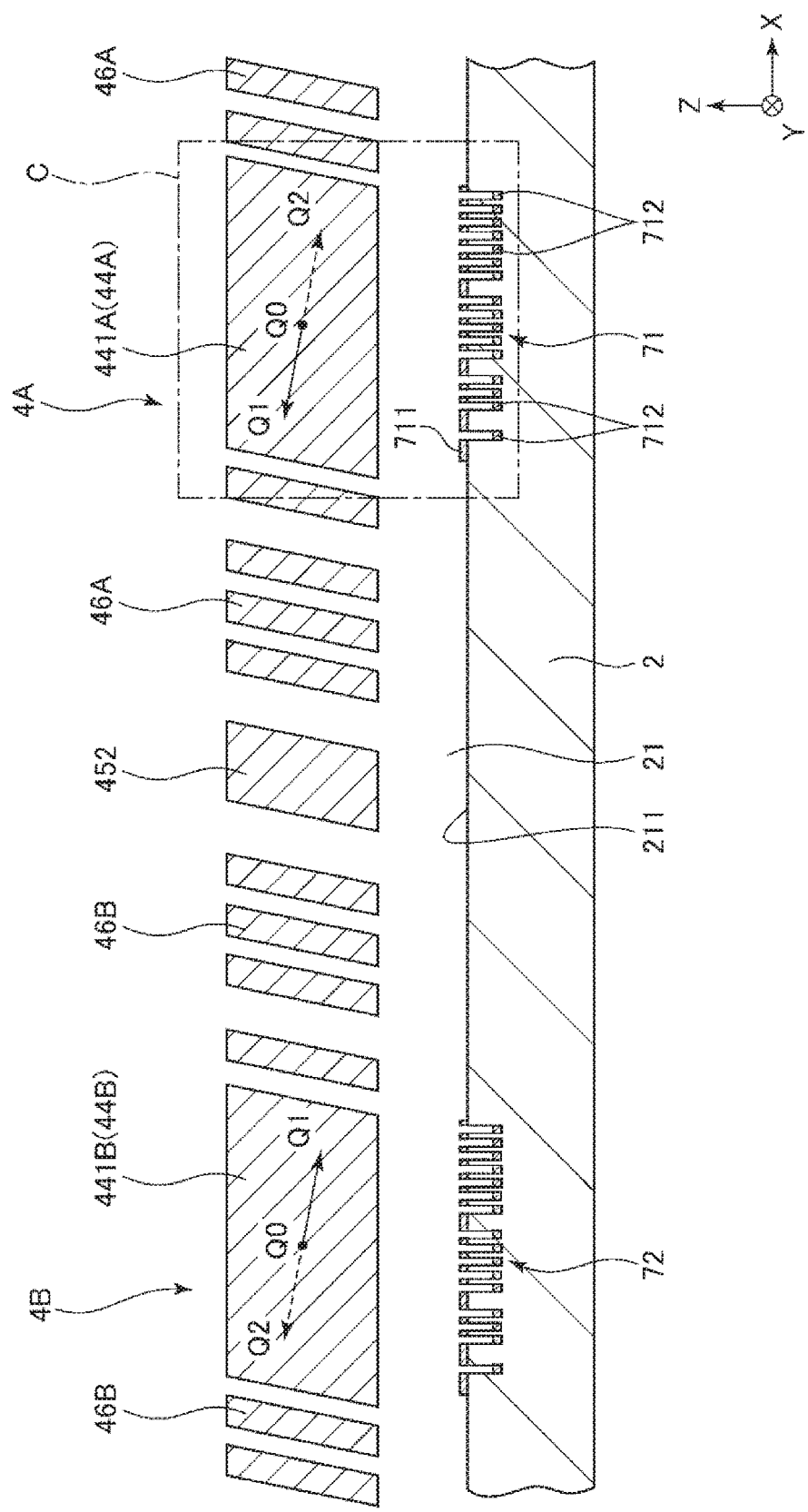
FIG. 5 is a cross-sectional view taken along line B-B in FIG. 3.
Figure 6:
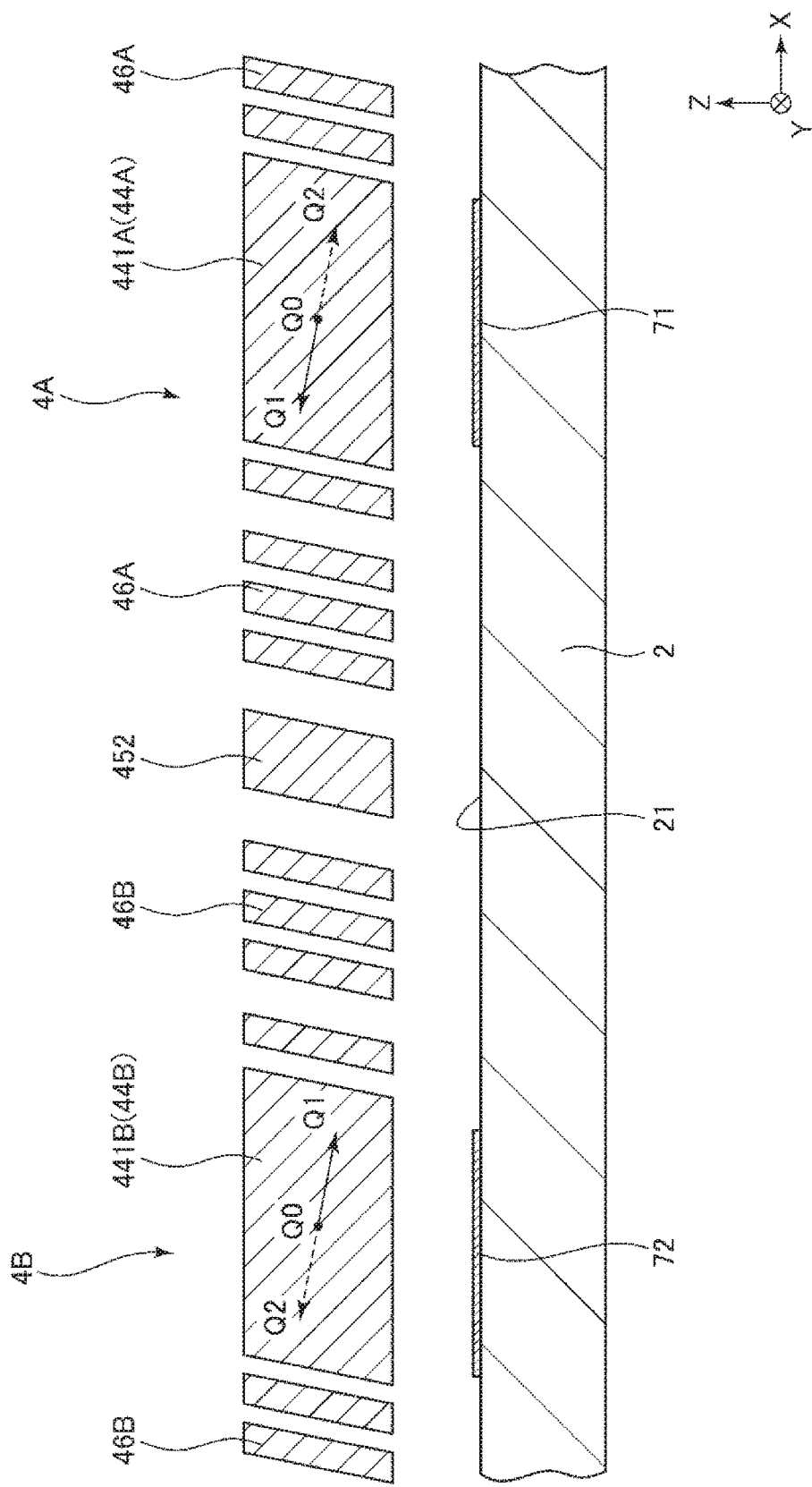
FIG. 6 is a cross-sectional view which illustrates an existing configuration and corresponds to FIG. 5.
Figure 7:
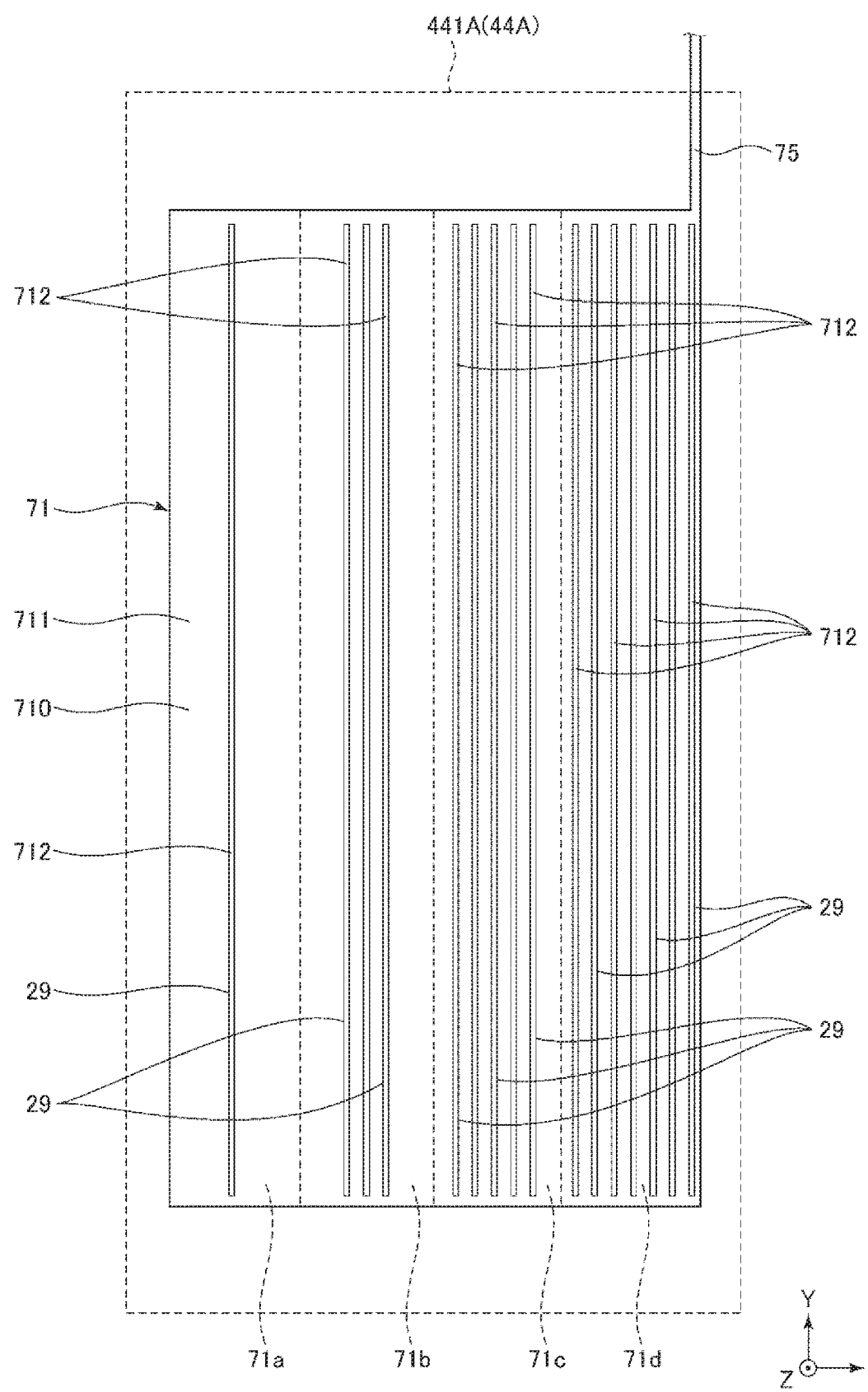
FIG. 7 is a plan view of a fixed detection electrode.
Figure 8:
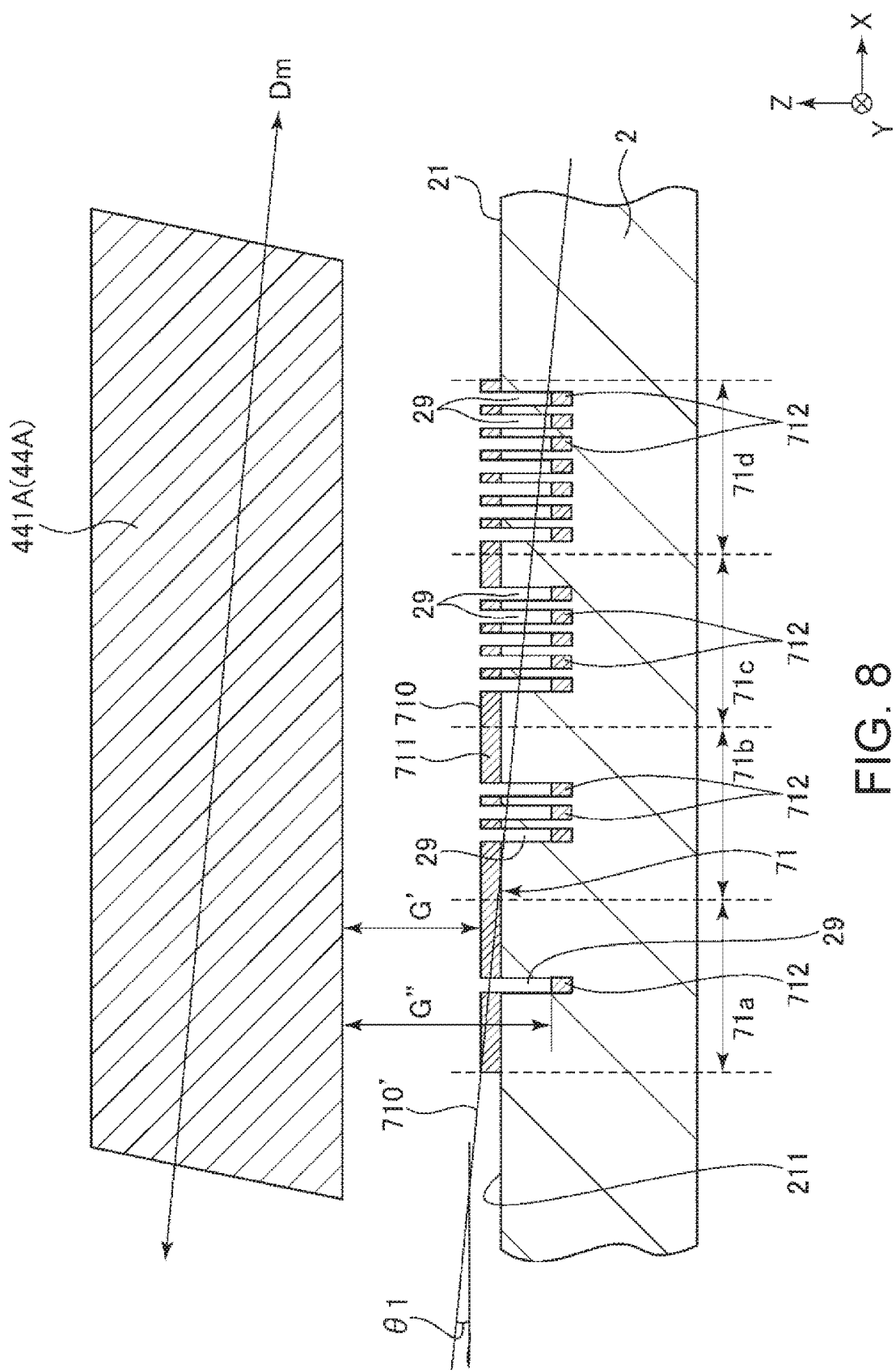
FIG. 8 is a cross-sectional view illustrating a region C in FIG. 5.
Figure 9:
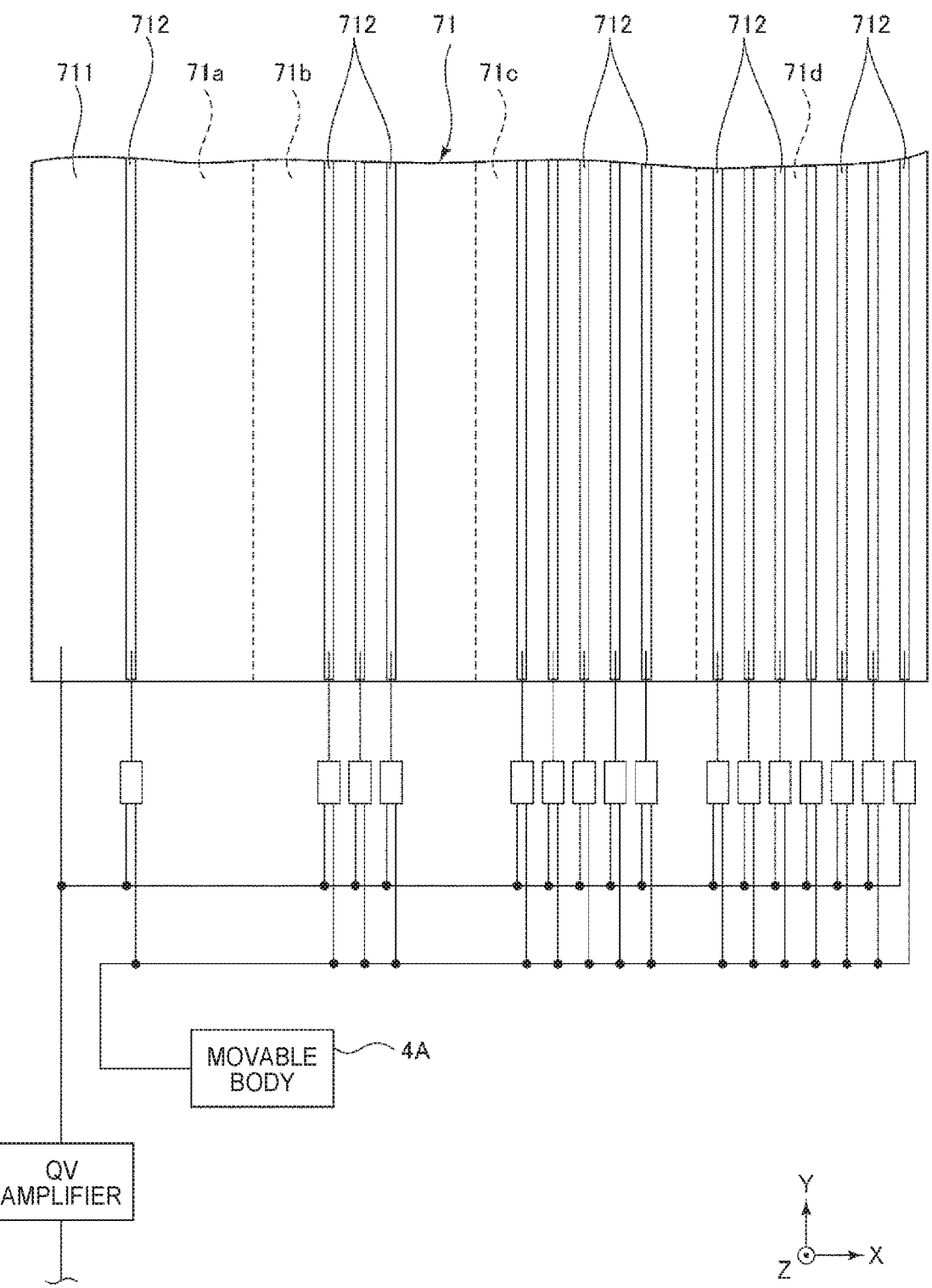
FIG. 9 is a plan view illustrating an electrical configuration of the fixed detection electrode illustrated in FIG. 7.
Figure 10:
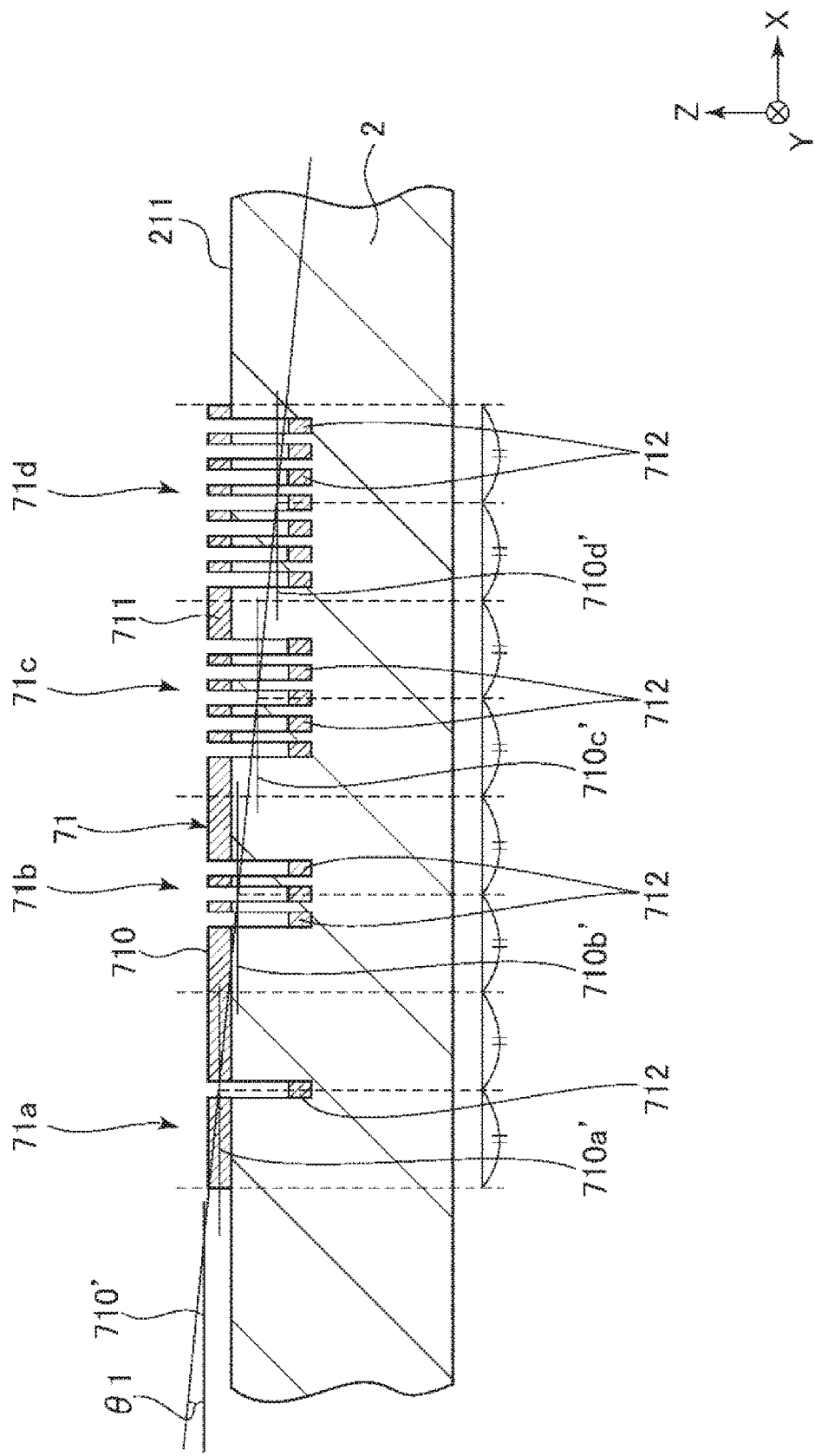
FIG. 10 is another cross-sectional view illustrating the region C in FIG. 5.
Figure 11:
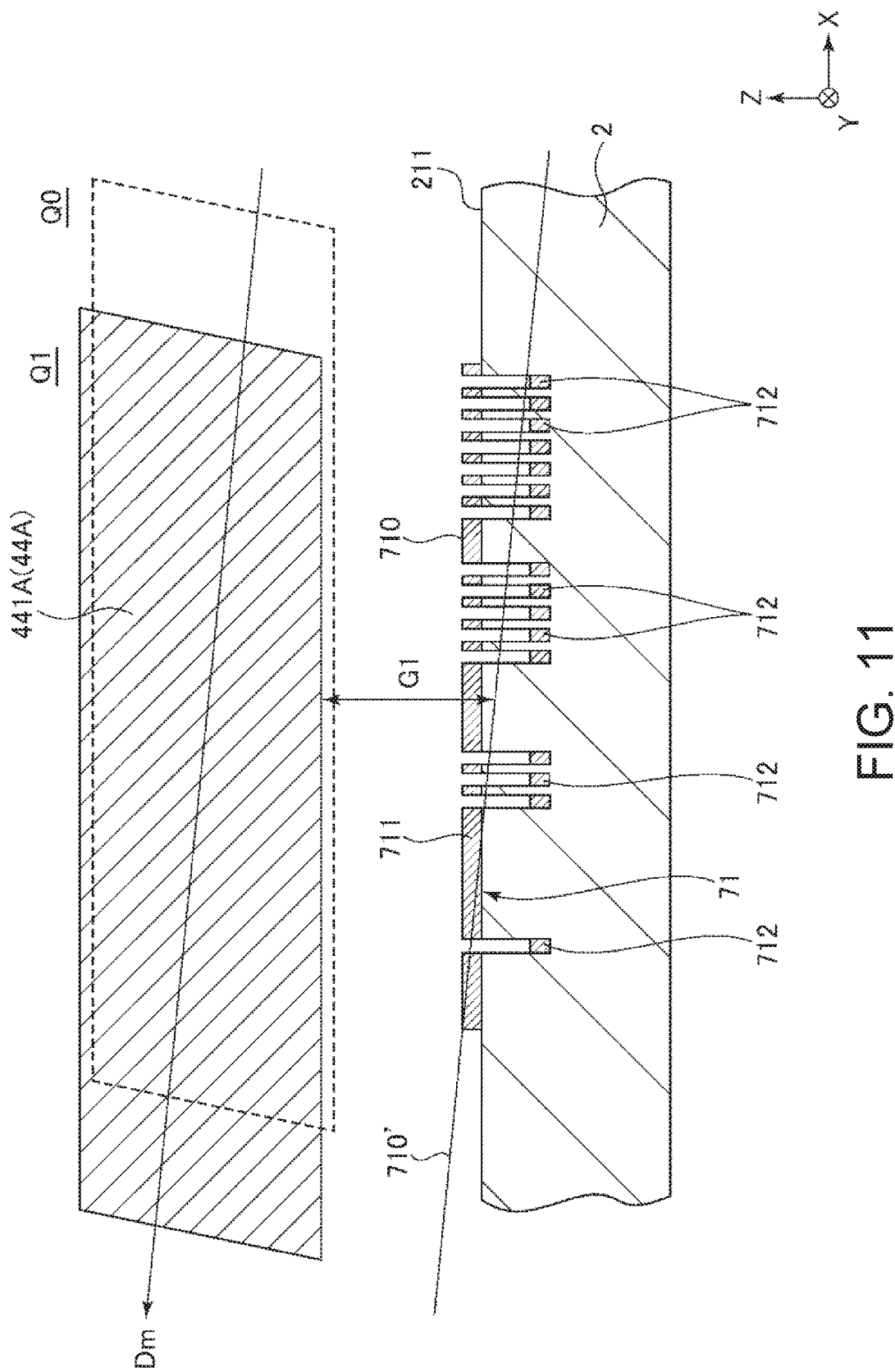
FIG. 11 is still another cross-sectional view illustrating the region C in FIG. 5.
Figure 12:
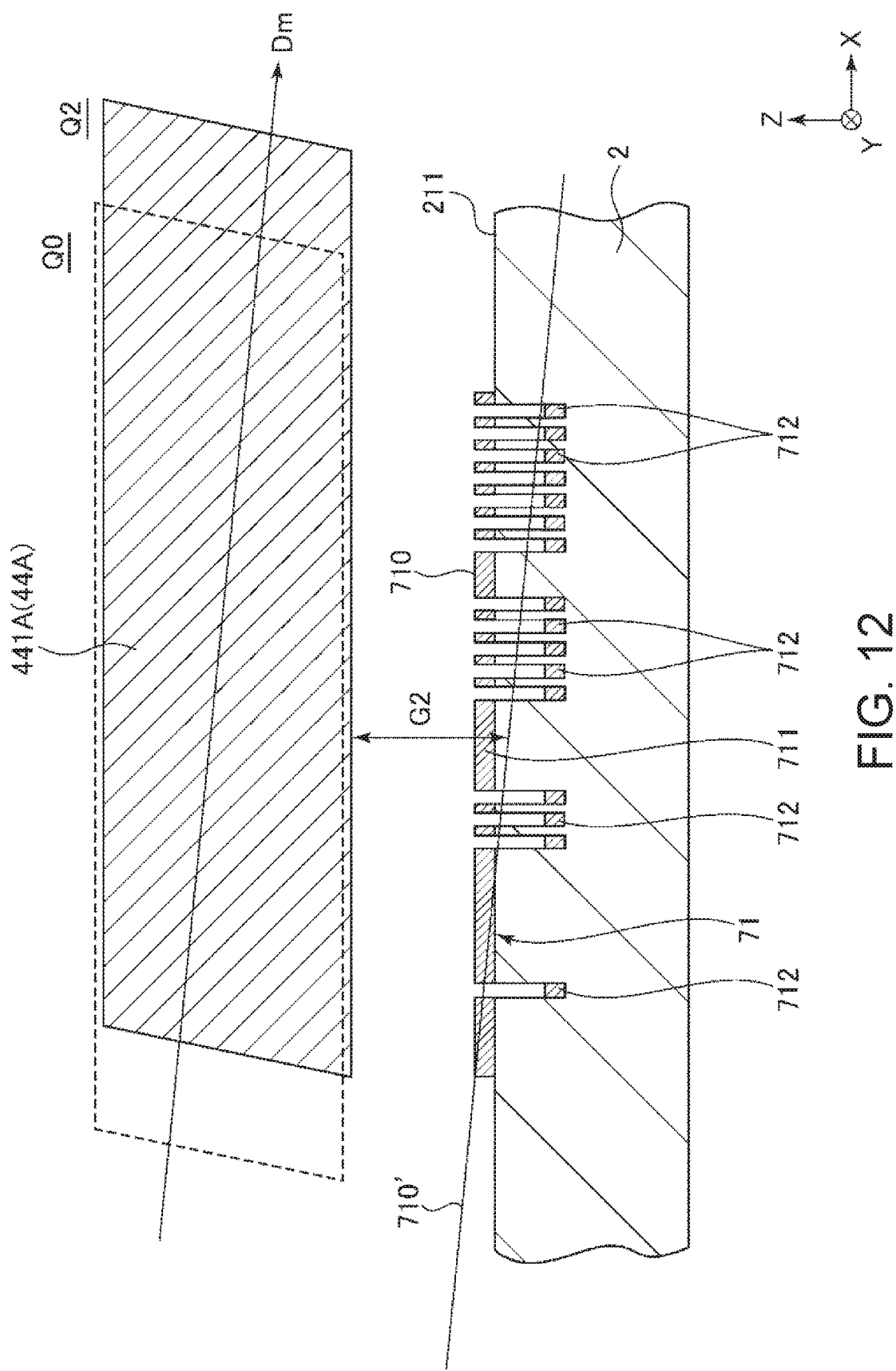
FIG. 12 is still another cross-sectional view illustrating the region C in FIG. 5.
Figure 13:
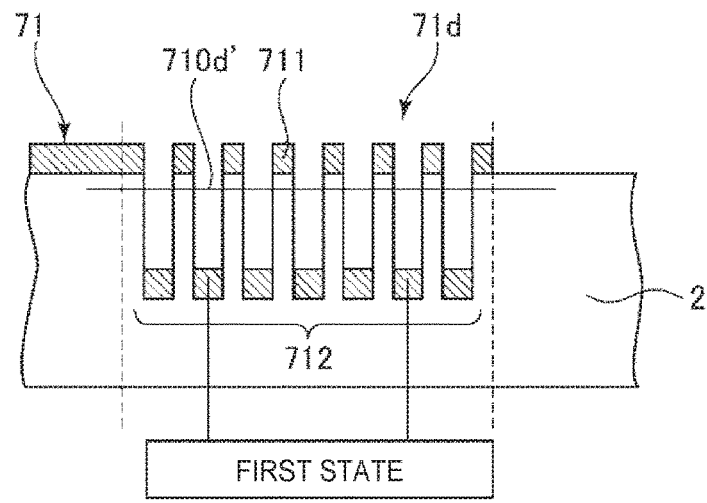
FIG. 13 is a cross-sectional view for explaining a function of a second detection electrode included in the fixed detection electrode.
Figure 14:
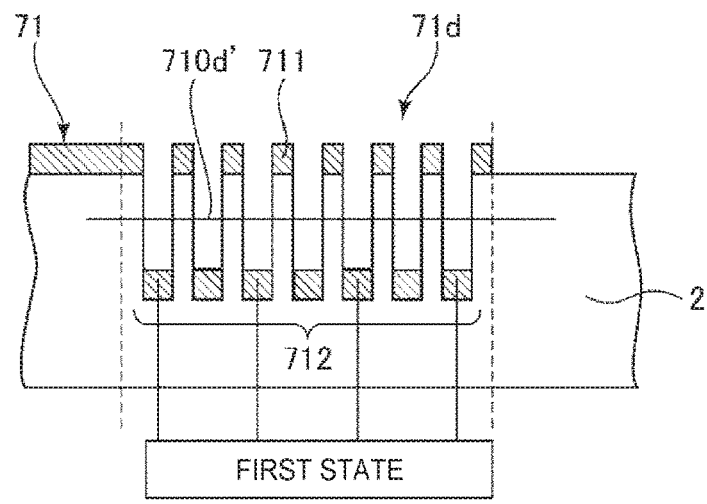
FIG. 14 is another cross-sectional view for explaining the function of the second detection electrode included in the fixed detection electrode.
Figure 15:
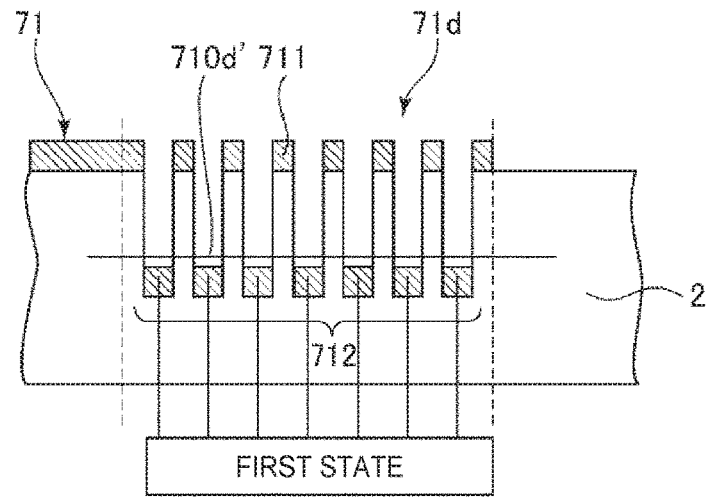
FIG. 15 is still another cross-sectional view for explaining the function of the second detection electrode included in the fixed detection electrode.
Figure 16:
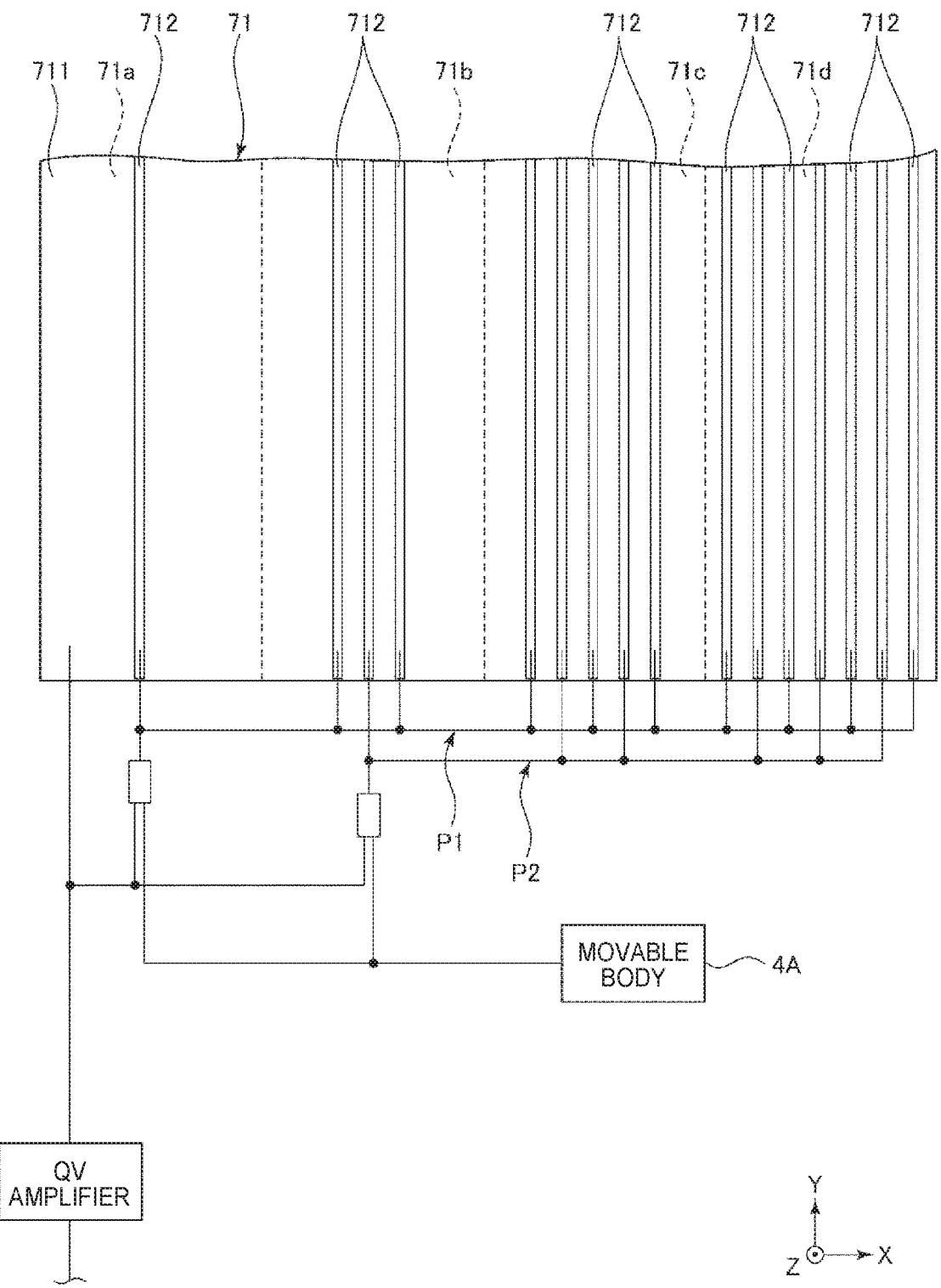
FIG. 16 is a plan view illustrating a modification example of the electrical configuration illustrated in FIG. 9.

FIG. 1 is a plan view illustrating a physical quantity sensor according to the first embodiment of the invention. FIG. 2 is a cross-sectional view taken along line A-A in FIG. 1. FIG. 3 is a plan view illustrating a sensor element included in the physical quantity sensor of FIG. 1. FIG. 4 is a diagram illustrating a voltage to be applied to the physical quantity sensor of FIG. 1. FIG. 5 is a cross-sectional view taken along line B-B in FIG. 3. FIG. 6 is a cross sectional view which illustrates an existing configuration and corresponds to FIG. 5. FIG. 7 is a plan view of a fixed detection electrode. FIG. 8 is a cross-sectional view illustrating a region C in FIG. 5. FIG. 9 is a plan view illustrating an electrical configuration of the fixed detection electrode illustrated in FIG. 7. Each of FIGS. 10 to 12 is a cross-sectional view illustrating the region C in FIG. 5. Each of FIGS. 13 to 15 is a cross-sectional view for explaining a function of a second detection electrode included in the fixed detection electrode. FIG. 16 is a plan view illustrating a modification example of the electrical configuration illustrated in FIG. 9.

In each drawing, the X-axis, Y-axis, and Z-axis are illustrated as three axes orthogonal to each other. A direction parallel to the X-axis is referred to as an "X-axis direction (second direction)", a direction parallel to the Y-axis is referred as a "Y-axis direction (third direction)", and a direction parallel to the Z-axis is referred as a "Z-axis direction (first direction)". A tip end side of the arrow of each axis is also referred to as a "plus side", and the opposite side is also referred to a "minus side". In addition, the plus side in the Z-axis direction is also referred to as "upper", and the minus side in the Z-axis direction is also referred to as "lower".

In the specification of the present application, the term "orthogonal to" includes not only a case where constituent elements intersect at 90° but also a case where the constituent elements intersect at an angle slightly inclined from 90° (for example, 90°±5°). Specifically, a case where the X-axis is inclined by ±5° with respect to the normal direction of the YZ-plane, a case where the Y-axis is inclined by ±5° with respect to the normal direction of the XZ-plane, and a case where the Z-axis is inclined by ±5° with respect to the normal direction of the XY-plane are also included in the term "orthogonal to".

The physical quantity sensor 1 illustrated in FIG. 1 is an angular velocity sensor capable of measuring the angular velocity ωy around the Y-axis. The physical quantity sensor 1 includes a substrate 2, a lid body 3, and a sensor element 4.

As illustrated in FIG. 1, the substrate 2 is formed in a rectangular plan view shape. The substrate 2 includes a concave portion 21 (concavity) which is open to the upper surface. The concave portion 21 functions as a relief portion for preventing contact between the sensor element 4 and the substrate 2. The substrate 2 includes a plurality of mounts 221, 222, and 224 protruding from the bottom surface of the concave portion 21. The sensor element 4 is bonded to the upper surfaces of the mounts 221, 222, and 224. With this configuration, it is possible to support the sensor element 4 in a state where contact with the substrate 2 is prevented.

Fixed detection electrodes 71 and 72 (detection electrodes) are disposed on the bottom surface of the concave portion 21. The substrate 2 includes a groove portion which is open to the upper surface, and wirings 73, 74, 75, 76, 77, and 78 are disposed thereon. One end portion of each of the wirings 73, 74, 75, 76, 77, and 78 is exposed to the outside of the lid body 3, respectively, and function as electrode pads P that make electrical connection with an external device.

As such a substrate 2, for example, a glass substrate made of a glass material containing alkali metal ions (sodium ions), specifically, a borosilicate glass such as Tempax glass (registered trademark) and Pyrex glass (registered trademark) can be used. However, a constituent material of the substrate 2 is not particularly limited, and a silicon substrate, a ceramic substrate, and the like may be used.

As illustrated in FIG. 1, the lid body 3 has a rectangular shape in a plan view. Further, as illustrated in FIG. 2, the lid body 3 has a concave portion 31 (concavity) which opens to the lower surface. The lid body 3 is bonded to the upper surface of the substrate 2 so as to accommodate the sensor element 4 in the concave portion 31. An accommodation space S in which the sensor element 4 is accommodated is formed inside the lid body 3 and the substrate 2. It is preferable that the accommodation space S is in a reduced pressure state, particularly in a vacuum state. As a result, the viscous resistance decreases, and the sensor element 4 can efficiently vibrate.

As such a lid body 3, for example, a silicon substrate can be used. However, the lid body 3 is not particularly limited, and for example, a glass substrate or a ceramic substrate may be used as the lid body 3. The bonding method between the substrate 2 and the lid body 3 is not particularly limited, and may be appropriately selected depending on the materials of the substrate 2 and the lid body 3. However, for example, anodic bonding, active bonding for bonding the bonding surfaces activated by plasma irradiation, bonding with a bonding material such as glass frit, diffusion bonding for bonding the metal films formed on the upper surface of the substrate 2 and the lower surface of the lid body 3, and the like may be included. In the first embodiment, the substrate 2 and the lid body 3 are bonded via a glass frit 39 (low melting point glass).

The sensor element 4 is disposed in an accommodation space S and is bonded to the upper surfaces of the mounts 221, 222, and 224. The sensor element 4 can be formed by patterning a conductive silicon substrate doped with, for example, impurities such as phosphorus (P), boron (B), arsenic (As) or the like by a dry etching method (particularly the "Bosch process").

Hereinafter, a configuration of the sensor element 4 will be described with reference to FIG. 3. In the following description, a straight line intersecting with the center O of the sensor element 4 and extending in the Y-axis direction in a plan view in the Z-axis direction is also referred to as an "imaginary straight line a".

As illustrated in FIG. 3, the shape of the sensor element 4 is symmetrical with respect to the imaginary straight line a. Such a sensor element 4 includes two drive portions 41A and 41B disposed on both sides of the imaginary straight line a. The drive portion 41A includes a comb teeth-shaped movable drive electrode 411A and a fixed drive electrode 412A disposed in a comb-teeth shape and disposed to be engaged with the movable drive electrode 411A. Similarly, the drive portion 41B includes a comb teeth-shaped movable drive electrode 411B and a fixed drive electrode 412B disposed in a comb-teeth shape and disposed to be engaged with the movable drive electrode 411B.

The fixed drive electrodes 412A and 412B are bonded to the upper surface of the mount 221, respectively, and are fixed to the substrate 2. The fixed drive electrodes 412A and 412B are electrically connected to the wiring 74, respectively.

The sensor element 4 includes four fixed portions 42A disposed around the drive portion 41A and four fixed portions 42B disposed around the drive portion 41B. Each of the fixed portions 42A and 42B is bonded to the upper surface of the mount 222 and fixed to the substrate 2. The sensor element 4 includes four drive springs 43A for connecting the respective fixed portions 42A and the movable drive electrode 411A and four drive springs 43B for connecting the fixed portions 42B and the movable drive electrode 411B.

The sensor element 4 includes a detection portion 44A positioned between the drive portion 41A and the imaginary straight line α, and a detection portion 44B positioned between the drive portion 41B and the imaginary straight line α. The detection portion 44A is configured by a plate-shaped movable detection electrode 441A. Similarly, the detection portion 44B is configured by a plate-shaped movable detection electrode 441B. Further, on the bottom surface of the concave portion 21, a fixed detection electrode 71 facing the movable detection electrode 441A and electrically connected to the wiring 75 and a fixed detection electrode 72 facing the movable detection electrode 441B and electrically connected to the wiring 76 are disposed. When the physical quantity sensor 1 is driven, an electrostatic capacitance Ca is formed between the movable detection electrode 441A and the fixed detection electrode 71 and an electrostatic capacitance Cb is formed between the movable detection electrode 441B and the fixed detection electrode 72.

The sensor element 4 includes a frame 48 positioned at the center portion (between detection portions 44A and 44B) thereof. The frame 48 has an "H" shape and includes a link portion 481 positioned on the plus side in the Y-axis direction and a link portion 482 positioned on the minus side in the Y-axis direction. A fixed portion 451 is disposed inside and outside of the link portion 481, and a fixed portion 452 is disposed inside and outside the link portion 482. With this configuration, the fixed portions 451 and 452 can be formed long in the Y-axis direction, a bonding area with the substrate 2 is increased correspondingly, and bonding strength between the substrate 2 and the sensor element 4 is increased. In addition, the fixed portions 451 and 452 are electrically connected to the wiring 73, respectively.

The sensor element 4 includes four detection springs 46A for coupling the movable detection electrode 441A and the fixed portions 42A, 451, and 452, and four detection springs 46B for coupling the movable detection electrode 441B and the fixed portions 42B, 451, and 452. The sensor element 4 includes a beam 47A which is positioned between the movable drive electrode 411A and the movable detection electrode 441A and connects the movable drive electrode 411A and the movable detection electrode 441A and includes a beam 47B which is positioned between the movable drive electrode 411B and the movable detection electrode 441B and connects the movable drive electrode 411B and the movable detection electrode 441B. In the following description, an aggregate of the movable drive electrode 411A, the movable detection electrode 441A, and the beam 47A is also referred to as a "movable body 4A", and an aggregate of the movable drive electrode 411B, the movable detection electrode 441B, and the beam 47B is also referred to as a "movable body 4B".

The sensor element 4 includes a frame 48 positioned at the center portion (between detection portions 44A and 44B) thereof. The sensor element 4 includes a frame spring 488 which is positioned between the fixed portion 451 and the frame 48 and connects these components, and a frame spring 489 which is positioned between the fixed portion 452 and the frame 48 and connects these components.

The sensor element 4 includes a connection spring 40A connecting the frame 48 and the movable detection electrode 441A and a connection spring 40B connecting the frame 48 and the movable detection electrode 441B. The connection spring 40A supports the movable detection electrode 441A together with the detection spring 46A, and the connection spring 40B supports the movable detection electrode 441B together with the detection spring 46B. With this configuration, the movable detection electrodes 441A and 441B can be supported in a more stable attitude, and unnecessary vibration of the movable detection electrodes 441A and 441B can be reduced.

For example, when a voltage V1 illustrated in FIG. 4 is applied to the movable bodies 4A and 4B via the wiring 73 and a voltage V2 illustrated in FIG. 4 is applied to the fixed drive electrodes 412A and 412B via the wiring 74, due to electrostatic attraction acting therebetween, the movable bodies 4A and 4B vibrate in opposite phases in such a way that the movable bodies 4A and 4B repeat approaching and separating from each other in the X-axis (drive vibration mode). When the angular velocity ωy is applied to the sensor element 4 in a state where the movable body 4A and the movable body 4B are vibrating in opposite phases in the X-axis direction, the movable detection electrodes 441A and 441B vibrate in opposite phases in the Z-axis direction due to the Coriolis force, and the electrostatic capacitances Ca and Cb change according to this vibration (detection vibration mode). For that reason, the angular velocity ωy can be obtained based on changes in the electrostatic capacitances Ca and Cb.

In the detection vibration mode, when the electrostatic capacity Ca increases, the electrostatic capacity Cb decreases, and on the contrary, when the electrostatic capacity Ca decreases, the electrostatic capacitance Cb increases. For that reason, by performing difference computation (subtraction processing: Ca−Cb) between a detection signal (signal corresponding to magnitude of the electrostatic capacitance Ca) obtained from the wiring 75 and a detection signal (signal corresponding to magnitude of the electrostatic capacitance Cb) obtained from the wiring 76, noise can be canceled, and the angular velocity ωy can be detected more accurately.

The voltages V1 and V2 are not particularly limited as long as the drive vibration mode can be excited. In the physical quantity sensor 1 of the first embodiment, although an electrostatic drive method is used in which the drive vibration mode is excited by electrostatic attraction force, a method of exciting the drive vibration mode is not particularly limited, and for example, a piezoelectric drive method, an electromagnetic drive method using a Lorentz force of a magnetic field, or the like can also be applied.

The sensor element 4 includes monitor portions 49A and 49B for detecting vibration states of the movable bodies 4A and 4B in the drive vibration mode. The monitor portion 49A includes a comb-teeth shaped movable monitor electrode 491A which is disposed on the movable detection electrode 441A and fixed monitor electrodes 492A and 493A which are disposed in a comb-teeth shape and disposed to be engaged with the movable monitor electrode 491A. Similarly, the monitor portion 49B includes a comb-teeth shaped movable monitor electrode 491B which is disposed on the movable detection electrode 441B and fixed monitor electrodes 492B and 493B which are disposed in a comb-teeth shape and disposed to be engaged with the movable monitor electrode 491B. The fixed monitor electrodes 492A, 493A, 492B, and 493B are respectively drawn out to the outside of the concave portion 21 and bonded to the upper surface of the substrate 2, and are fixed to the substrate 2.

The fixed monitor electrodes 492A and 492B are electrically connected to the wiring 77, and the fixed monitor electrodes 493A and 493B are electrically connected to the wiring 78. When the physical quantity sensor 1 is driven, an electrostatic capacitance Cc is formed between the movable monitor electrode 491A and the fixed monitor electrode 492A and between the movable monitor electrode 491B and the fixed monitor electrode 492B and an electrostatic capacitance Cd is formed between the movable monitor electrode 491A and the fixed monitor electrode 493A and the movable monitor electrode 491B and the fixed monitor electrode 493B. When the movable bodies 4A and 4B vibrate in the X-axis direction in the drive vibration mode, the electrostatic capacitances Cc and Cd change accordingly. For that reason, a detection signal is output based on changes in the electrostatic capacitances Cc and Cd, and a vibration state of the movable bodies 4A and 4B can be detected based on the output detection signal.

The vibration state (amplitude) of the movable bodies 4A and 4B detected using the outputs from the monitor portions 49A and 49B is fed back to a drive circuit that applies the voltage V2 to the movable bodies 4A and 4B. The drive circuit changes the frequency and the duty ratio of the voltage V2 so that amplitudes of the movable bodies 4A and 4B become target values. With this configuration, the movable bodies 4A and 4B can be more effectively vibrated and detection accuracy of the angular velocity ωy is improved.

The sensor element 4 has been described as above. As described above, the sensor element 4 can be formed by processing (patterning) the silicon substrate by the Bosch process. However, when the Bosch process is used, for example, a through-hole may be dug in the oblique direction inclined with respect to the vertical direction depending on the position in the chamber, the shape of the mask, and the like. When the through-hole is inclined, the sectional shape of each portion changes from a rectangle, and in the first embodiment, as illustrated in FIG. 5, each of the detection springs 46A and 46B has a parallelogram shape.

When the cross-sectional shape of each of the detection springs 46A and 46B changes from a rectangle, the movable bodies 4A and 4B vibrate (quadrature occurs) not only in the X-axis direction but also in the Z-axis direction in the drive vibration mode as indicated by arrows in FIG. 5, and vibrates in an oblique direction inclined with respect to the X-axis and the Z-axis (hereinafter, also referred to simply as "oblique vibration"). Accordingly, in the drive vibration mode, a first state Q1 in which the movable body 4A is positioned on the minus side in the X-axis direction with respect to the reference position Q0 (a natural state in which the voltages V1 and V2 are not applied) and is positioned on the plus side in the Z-axis direction and the movable body 4B is positioned on the plus side in the X-axis direction with respect to the reference position Q0 and positioned on the minus side in the Z-axis direction and a second state Q2 in which the movable body 4A is positioned on the plus side in the X-axis direction with respect to the reference position Q0 and positioned on the minus side in the Z-axis direction and the movable body 4B is positioned on the minus side in the X-axis direction with respect to the reference position Q0 and is positioned on the plus side in the Z-axis direction are repeated.

Here, as illustrated in FIG. 6, when the principal surfaces of the fixed detection electrodes 71 and 72 are flat (planar) surfaces as in the related art, the movable bodies 4A and 4B vibrate obliquely in the drive vibration mode, so that the electrostatic capacitances Ca and Cb change, and accordingly the noise signal (quadrature signal) is output. Accordingly, the quadrature signal is mixed in the detection signal, and detection precision of the angular velocity ωy is lowered. Therefore, in the first embodiment, in order to reduce the quadrature signal caused by the quadrature described above, the configurations of the fixed detection electrodes 71 and 72 are devised.

In the related art, the respective drive springs 43A and 43B, the respective detection springs 46A and 46B, and the connection springs 40A and 40B are subjected to laser processing, after the sensor element 4 is formed by the Bosch process, to correct the cross-sectional shape of each of the springs 43A, 43B, 46A, 46B, 40A and 40B so as to reduce quadrature itself of the sensor element 4. However, in such a method, a highly accurate processing technique is necessary and the manufacturing process becomes complicated as the laser processing is performed. Further, there is also a problem that the spring constants of the springs 43A, 43B, 46A, 46B, 40A, and 40B change by processing the springs and the drive frequencies (resonance frequencies) of the movable bodies 4A and 4B change in accordance with the change. Contrary to this, in the first embodiment, instead of reducing the quadrature itself by processing the sensor element 4 as in the related art, the quadrature signal itself is kept intact and the quadrature signal is reduced by keeping the quadrature itself as it is and devising the configuration of the fixed detection electrodes 71 and 72. For that reason, it is possible to suppress degradation of the detection accuracy of the angular velocity ωy by a simpler method than in the related art.

Hereinafter, although the fixed detection electrodes 71 and 72 will be described in detail, the fixed detection electrodes 71 and 72 have the same configuration and thus, the fixed detection electrode 71 will be representatively described below in the following description, and a description of the fixed detection electrode 72 will be omitted.

As illustrated in FIG. 7, the fixed detection electrode 71 includes a first detection electrode 711 and a plurality of second detection electrodes 712. The first detection electrode 711 is electrically connected to the wiring 75, and each of the second detection electrodes 712 is drawn to the outside of the accommodation space S via wirings (not illustrated) similarly to an electrode pad P.

As illustrated in FIG. 8, the plurality of second detection electrodes 712 are positioned more on the lower side (minus side in the Z-axis direction) than the first detection electrode 711, respectively. For that reason, a separation distance G' between the first detection electrode 711 and the movable detection electrode 441A is smaller than a separation distance G" between the second detection electrode 712 and the movable detection electrode 441A. That is, the relationship of G'<G" is satisfied. In the first embodiment, a plurality of concave portions 29 (concavities or slots) which are open to a bottom surface 211 of the concave portion 21 are formed, the first detection electrode 711 is disposed on the bottom surface 211 so as to surround the concave portions 29, and the second detection electrodes 712 are disposed on the bottom surface of the plurality of concave portions 29. With such a configuration, the relationship of G'<G" can be satisfied with a simple configuration.

The plurality of second detection electrodes 712 have substantially the same shape, and each has an elongated shape along the Y-axis direction. However, the shape of the second detection electrode 712 is not limited to this, and at least one of the plurality of second detection electrodes 712 may have a different shape (for example, the length in the Y-axis direction and the length in the X-axis direction) from the others.

Further, the plurality of second detection electrodes 712 are disposed to be aligned (e.g., aligned in an array) in the X-axis direction. The plurality of second detection electrodes 712 are disposed so as to be dense from the minus side toward the plus side in the X-axis direction. In other words, with respect to the center in the X-axis direction of the fixed detection electrode 71, the number of the second detection electrodes 712 positioned on the plus side in the X-axis direction is larger than the number of the second detection electrodes 712 positioned on the minus side in the X-axis direction.

As illustrated in FIGS. 7 and 8, regions obtained by dividing the fixed detection electrode 71 into four parts in such a manner that the widths (length in the X-axis direction) thereof are equal along the X-axis direction are designated as regions 71a, 71b, 71c, and 71d in order from the minus side in the X-axis direction, one second detection electrode 712 is provided in the region 71a, three second detection electrodes 712 are provided in the region 71b, five second detection electrodes 712 are provided in the region 71c, and seven second detection electrodes 712 are provided in the first detection electrode 71d. However, the number of second detection electrodes 712 provided in each of the regions 71a, 71b, 71c, and 71d is not particularly limited, and for example, the number of the second detection electrodes 712 may be the same in each of the regions 71a, 71b, 71c, and 71d.

As illustrated in FIG. 9, the first detection electrode 711 is connected to a QV amplifier (charge voltage conversion circuit) and functions as a detection electrode body for measuring the angular velocity ωy. Here, as described above, since the plurality of second detection electrodes 712 are disposed so as to increase in density from the minus side toward the plus side in the X-axis direction, when the area of the first detection electrode 711 in the region 71a is M1, the area of the first detection electrode 711 in the region 71b is M2, the area of the first detection electrode 711 in the region 71c is M3, and the area of the first detection electrode 711 in the region 71d is M4, the relationship between M1, M2, M3, and M4 is M1>M2>M3>M4. As such, by satisfying the relationship of M1>M2>M3>M4, as illustrated in FIG. 8, the principal surface 710 of the fixed detection electrode 71 can be inclined with respect to the X-axis in a pseudo (equivalent) manner (pseudo-inclined). In the following, the pseudo-inclined principal surface 710 is referred to as a "pseudo principal surface 710'". In the first embodiment, although M1>M2>M3>M4 is satisfied, it suffices if at least M1≥M2≥M3≥M4 (excluding the case of M1=M2=M3=M4) is satisfied.

For example, as illustrated in FIG. 10, the pseudo principal surface 710' can be defined by a straight line obtained by selecting two pseudo principal surfaces from a pseudo (equivalent) principal surface 710a' of the region 71a and a pseudo (equivalent) principal surface 710b' of the region 71b, a pseudo (equivalent) principal surface 710c' of the region 71c, and a pseudo principal surface 710d' of the region 71d in a cross-sectional view in the Y-axis direction and connecting centers of the selected principal surfaces in the X-axis direction. In the first embodiment, the pseudo principal surface 710' is defined by a line connecting the centers of the principal surfaces 710a' and 710d' in the X-axis direction, and furthermore, the centers of the principal surfaces 710b' and 710c' in the X-axis direction are respectively positioned on this straight line.

As the pseudo principal surface 710' is inclined with respect to the X-axis direction, as illustrated in FIGS. 11 and 12, the difference ΔG between the separation distance G1 (average separation distance) between the movable detection electrode 441A and the pseudo principal surface 710' when the movable detection electrode 441A is in the first state Q1 and the separation distance G2 (average separation distance) between the movable detection electrode 441A and the pseudo principal surface 710' when the movable detection electrode 441A is in the second state Q2 becomes small (preferably 0). Accordingly, change in the electrostatic capacitance Ca in the drive detection vibration mode is reduced, and the quadrature signal can be reduced accordingly.

Although the difference ΔG between the separation distances G1 and G2 is not particularly limited, for example, in a configuration in which the principal surface 710 of the fixed detection electrode 71 as illustrated in FIG. 6 is a flat surface, the difference ΔG is preferably smaller than the difference ΔG' when the difference between a separation distance G1' between the detection electrode 441A and the principal surface 710 in the first state Q1 and a separation distance G2' between the detection electrode 441A and the principal surface 710 in the second state Q2 is ΔG'. That is, it is preferable that ΔG<ΔG'. With this configuration, it is possible to more reliably reduce the quadrature signal compared to the configuration of the related art as illustrated in FIG. 6. It is more preferable that ΔG<0.5 ΔG', and it is further preferable that ΔG<0.1 ΔG'. With this configuration, the effect described above can be exhibited more remarkably.

Here, it is preferable that openings of the grooves forming G1 and G2 are substantially aligned with each other in a plan view. With this configuration, the depths of the grooves formed by etching the substrate 2 (glass or the like) are more likely to be aligned, thereby making it possible to reduce variations.

In a cross-sectional view in the Y-axis direction, it is preferable that the pseudo principal surface 710' is parallel to an oblique vibration direction Dm of the movable detection electrode 441A. By making the pseudo principal surface 710' and the oblique vibration direction Dm parallel to each other, the difference ΔG between the separation distances G1 and G2 can be further reduced. For that reason, it is possible to reduce the quadrature signal more effectively. The phrase "the pseudo principal surface 710' and the oblique vibration direction Dm are parallel" means including a case where the pseudo principal surface 710' is slightly deviated from parallel (=is slightly out of parallel), such as deviation that may occur during manufacturing, and for example, means that an inclination between the pseudo principal surface 710' and the oblique vibration direction Dm is within 2°.

As described above, it is preferable that the pseudo principal surface 710' and the oblique vibration direction Dm of the movable detection electrode 441A are parallel to each other, but the oblique vibration direction Dm of the movable detection electrode 441A tends to vary depending on etching conditions and the like, and it is also difficult to control the variation. For that reason, the pseudo principal surface 710' may be inclined with respect to the oblique vibration direction Dm of the movable detection electrode 441A. Accordingly, the fixed detection electrode 71 has means for changing the inclination of the pseudo principal surface 710', the means is the plurality of second detection electrodes 712. That is, the plurality of second detection electrodes 72 function as inclination correction electrodes for correcting the inclination of the pseudo principal surface 710'.

The plurality of second detection electrodes 712 can be independently selected to be in a first state where each second detection electrode 712 is electrically connected to the first detection electrode 711 and a second state in which each second detection electrode 712 is not electrically connected to the first detection electrode 711. The first state and the second state are selected by the substrate 2 and a selection circuit provided separately from the substrate 2. In the first state, the plurality of second detection electrodes 712 function as electrodes for detecting the angular velocity ωy together with the first detection electrode 711, but in the second state, the second detection electrodes 712 do not function as electrodes for detecting the angular velocity ωy. For each of the second detection electrodes 712, it is possible to correct the inclination of the pseudo principal surface 710' by selecting the first state or the second state. Specifically, for example, as illustrated in FIGS. 13 to 15, in the region 71*d*, as the number of the second detection electrodes 712 in the first state increases, the height of the pseudo principal surface 710*d'* of the region 71*d* decreases. Likewise for the other regions 71*a*, 71*b*, and 71*c*, as the number of the second detection electrodes 712 in the first state increases, the heights of the pseudo principal faces of the other regions 71*a*, 71*b*, and 71*c* decrease. For that reason, by selecting the number and locations of the second detection electrodes 712 to be in the first state, the inclination of the pseudo principal surface 710' with respect to the X-axis direction can be changed, and the inclination of the pseudo principal surface 710' can be aligned with the oblique vibration direction Dm of the movable detection electrode 441A. As a result, the quadrature signal can be more reliably reduced.

In particular, in the first embodiment, since the fixed detection electrode 71 includes the plurality of second detection electrodes 712, it is possible to correct the inclination of the pseudo principal surface 710' in multiple stages. For that reason, it is easy to adjust the inclination of the pseudo principal surface 710' to a desired inclination, and the inclination of the pseudo principal surface 710' can be aligned with the oblique vibration direction Dm of the movable detection electrode 441A more reliably. Further, in the first embodiment, since the second detection electrode 712 is disposed on both sides with respect to the center of the fixed detection electrode 71 in the X-axis direction, for example, the inclination adjustment range of the pseudo principal surface 710' becomes larger that the case where the second detection electrode 712 is disposed only on one side. For that reason, it is easy to adjust the inclination of the pseudo principal surface 710' to a desired inclination.

In the second state where the second detection electrode 712 is not electrically connected to the first detection electrode 711, the second detection electrode 712 is electrically connected to the movable body 4A (movable detection electrode 441A). With this configuration, since the second detection electrode 712 and the movable detection electrode 441A have the same potential, substantially no unnecessary electrostatic capacitance and electrostatic attraction force can be generated between the second detection electrode 712 and the movable detection electrode 441A, the vibration of the movable body 4A can be stabilized, and deterioration in detection accuracy of the angular velocity ωy can be suppressed.

The inclination (angle θ1 formed between the pseudo principal surface 710' and the X-axis) of the pseudo principal surface 710' with respect to the X-axis direction is not particularly limited, but it is preferably, for example, 0.1° or more and 3.0° or less. Generally, since the inclination (angle formed by the oblique vibration direction Dm and the X-axis) of the oblique vibration caused by the Bosch process with respect to the X-axis direction is 0.1° or more and 3.0° or less, it is easy to make the pseudo principal surface 710' parallel to the direction Dm of the oblique vibration by setting the inclination of the pseudo principal surface 710' with respect to the X-axis direction within the above range. For that reason, the difference ΔG between the separation distances G1 and G2 can be further reduced, and the quadrature signal can be reduced more effectively.

Each of the second detection electrodes 712 has an elongated shape whose longitudinal direction is the Y-axis direction, and is formed over almost the entire region of the fixed detection electrode 71 in the Y-axis direction. For that reason, the inclination of the pseudo principal surface 710' can be corrected at any position in the Y-axis direction. Accordingly, the effect described above can be exhibited more remarkably. Although not particularly limited, for example, each second detection electrode 712 is preferably formed over 70% or more of the fixed detection electrode 71 in the Y-axis direction, more preferably, is formed over 80% or more, and further preferably, is formed over 90% or more.

Further, as illustrated in FIG. 8, the heights (depths of the concave portions 29) of the respective second detection electrodes 712 are preferably equal to each other. As such, the configuration of the fixed detection electrode 71 is simplified by aligning the heights of the respective second detection electrodes 712. Also, it is easy to form the fixed detection electrode 71. Specifically, since the plurality of concave portions 29 are formed on the bottom surface of the concave portion 21 by etching, the depths of the respective concave portions 29 are aligned (equal) so as to make it possible to form all the concave portions 29 at the same time by a single etching. For that reason, it is easy to form the fixed detection electrode 71. The depth of each concave portion 29 is not particularly limited, but it is preferable to set the depth to, for example, 0.1 μm or more and 2 μm or less.

The expression "the depth of each concave portion 29 is equal" not only includes the case where the depths coincide but also the case where the depth differs slightly (for example, ±2%), such as deviation that can occur in manufacturing. However, at least one of the plurality of concave portions 29 may have a different depth from the other concave portions.

The physical quantity sensor 1 has been described as above. As described above, the physical quantity sensor 1 includes the movable body 4A and the fixed detection electrode 71 (detection electrode) including the first detection electrode 711 disposed so as to face the movable body 4A and the second detection electrode 712 disposed so as to face the movable body 4A and having a separation distance G" from the movable body 4A different from a separation distance G' between the movable body 4A and the first detection electrode 711. Then, when the direction in which the movable body 4A and the first detection electrode 711 are aligned (face one another) is defined as the Z-axis direction (first direction) and the direction orthogonal to the Z-axis direction is defined as the X-axis direction (second direction), the vibration of the movable body 4A has a drive vibration mode in which vibration in the Z-axis direction and vibration in the X-axis direction are combined. The second detection electrode 712 is disposed so as to be deviated (unequally distributed) from the center of the fixed detection electrode 71 in the X-axis direction in a plan view in the Z-axis direction. With such a configuration, since it is possible to effectively incline the pseudo principal surface 710' in accordance with (to match) the oblique vibration direction Dm, the difference ΔG between the separation distance G1 in the first state Q1 and the separation distance G2 in the second state Q2 can be made smaller than that of the configuration of the related art illustrated in FIG. 6. For that reason, the quadrature signal can be reduced.

As described above, in the physical quantity sensor 1, the first state in which the first detection electrode 711 and the second detection electrode 712 are electrically connected and the second state in which the first detection electrode 711 and the second detection electrode 712 are not electrically connected can be selected. With such a configuration, one of the first state and the second state is selected so as to make it possible to correct the inclination of the pseudo principal surface 710' and to adjust the inclination of the pseudo principal surface 710' to the oblique vibration direction Dm. For that reason, it is possible to reduce the quadrature signal more effectively.

As described above, in the second state, the second detection electrode 712 and the movable body 4A are electrically connected. For that reason, the second detection electrode 712 and the movable body 4A have the same potential, and an unintended electrostatic attraction force is not generated between the second detection electrode 712 and the movable body 4A, so that the movable body 4A can be stably vibrated. As a result, detection accuracy of the angular velocity ωy is stabilized.

As described above, when the direction orthogonal to the Z-axis direction and the X-axis direction is set as the Y-axis direction (third direction), the second detection electrode 712 is elongated along the Y-axis direction. For that reason, the inclination of the pseudo principal surface 710' can be aligned with the oblique vibration direction Dm over a wide range in the Y-axis direction. Accordingly, quadrature signals can be reduced more effectively.

As described above, the fixed detection electrode includes the plurality of second detection electrodes 712. With this configuration, since it is possible to adjust the inclination of the pseudo principal surface 710' in a multistage manner, it is easy to correct the inclination of the pseudo principal surface 710' to the desired inclination. Accordingly, quadrature signals can be reduced more effectively.

As described above, the plurality of second detection electrodes 712 are positioned on both sides in the X-axis direction with respect to the center of the fixed detection electrode 71 in the X-axis direction in a plan view in the Z-axis direction. With such a configuration, for example, the adjustment range of the inclination of the pseudo principal surface 710' becomes larger than in the case where the second detection electrode 712 is disposed only on one side with respect to the center of the fixed detection electrode 71 in the X axis direction. For that reason, it is easy to correct the inclination of the pseudo principal surface 710' to the desired inclination. For that reason, quadrature signals can be reduced more effectively.

As described above, the physical quantity sensor 1 includes the substrate 2 disposed so as to face the movable body 4A. The substrate 2 includes the bottom surface 211 (principal surface) of the concave portion 21 facing the movable body 4A and the concave portion 29 that is open to the bottom surface 211. The first detection electrode 711 is disposed on the bottom surface 211, and the second detection electrodes 712 are disposed on the inner bottom surfaces of the concave portions 29. With this configuration, the separation distance G' between the movable body 4A and the first detection electrode 711 and the separation distance G" between the movable body 4A and the second detection electrode 712 can be made different with a simple configuration.

As described above, the physical quantity sensor 1 can measure the angular velocity ωy around the detection axis (Y-axis) along the Y-axis direction. With this configuration, the physical quantity sensor 1 with high convenience is obtained.

As described above, the output signal adjustment method of the physical quantity sensor 1 includes the movable body 4A, the fixed detection electrode 71 (detection electrode) which includes the first detection electrode 711 disposed so as to face the movable body 4A and the second detection electrode 712 disposed so as to face the movable body 4A and having the separation distance G' between the movable body 4A and the second detection electrode different from the separation distance G" between the movable body 4A and the first detection electrode 711, and in which when the direction in which the movable body 4A and the first detection electrode 711 are aligned is set as the Z-axis direction (first direction) and the direction orthogonal to the Z-axis direction is defined as the X-axis direction (second direction), the vibration of the movable body 4A has the drive vibration mode in which vibration in the Z-axis direction and vibration in the X-axis direction are combined, and the second detection electrode 712 is disposed so as to be deviated (more densely distributed) in the X-axis direction from the center of the fixed detection electrode 71 in the X-axis direction in a plan view in the Z-axis direction. One of the first state in which the first detection electrode 711 and the second detection electrode 712 are electrically connected and the second state in which the first detection electrode 711 and the second detection electrode 712 are not electrically connected is selected, so that the output signal is adjusted by changing the inclination of the fixed detection electrode 71 with respect to the X axis direction in a pseudo (equivalent manner) manner. With such a method, since it is possible to incline the pseudo principal surface 710' according to the oblique vibration direction Dm, the difference ΔG between the separation distance G1 in the first state Q1 and the separation distance G2 in the second state Q2 can be made smaller than that of the configuration of the related art as illustrated in FIG. 6. For that reason, quadrature signals can be reduced.

In the first embodiment, the respective second detection electrodes 712 can be independently selected to be in the first state and the second state, but is not limited thereto. For example, as illustrated in FIG. 16, a configuration in which a first pattern P1 in which a plurality of second detection electrodes 712 are electrically connected and a second pattern P2 in which a plurality of second detection electrodes 712 not included in the first pattern P1 are electrically connected are included, and the first state or the second state may be selectable for each of the first and second patterns P1 and P2 may be allowed. Even with such a configuration, it is possible to correct the inclination of the pseudo principal surface 710'. The number of patterns is not limited to two.

Second Embodiment

Next, a physical quantity sensor according to a second embodiment of the invention will be described.

Figure 17:
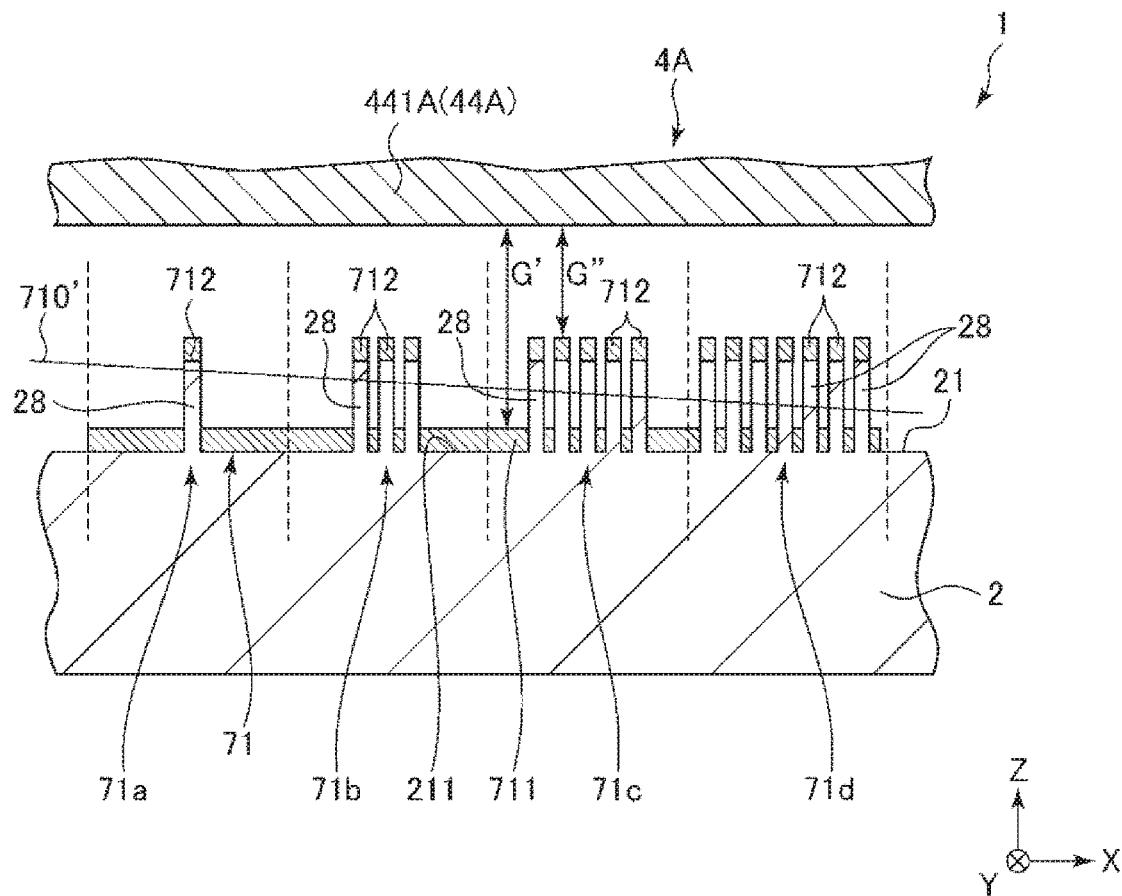
FIG. 17 is a cross-sectional view of a fixed detection electrode included in a physical quantity sensor according to a second embodiment of the invention.

FIG. 17 is a cross-sectional view of a fixed detection electrode included in the physical quantity sensor according to the second embodiment of the invention.

The physical quantity sensor 1 according to the second embodiment is the same as the physical quantity sensor 1 of the first embodiment described above, except that the configuration of the fixed detection electrodes 71 and 72 is different. In the following description, differences between the physical quantity sensor 1 of the second embodiment and the first embodiment described above will be mainly described, and description of similar matters will be omitted. In FIG. 17, the same reference numerals are given to the same configurations as those of the first embodiment described above. Since the fixed detection electrodes 71 and 72 have the same configuration, in the following, the fixed detection electrode 71 will be representatively described and description of the fixed detection electrode 72 will be omitted.

As illustrated in FIG. 17, the fixed detection electrode 71 of the second embodiment includes the first detection electrode 711 and the plurality of second detection electrodes 712. Each of the plurality of second detection electrodes 712 is positioned more on the upper side (plus side in the Z-axis direction) than the first detection electrode 711. For that reason, the separation distance G' between the first detection electrode 711 and the movable detection electrode 441A is greater than the separation distance G" between the second detection electrode 712 and the movable detection electrode 441A. That is, the relationship of G'>G" is satisfied.

In the second embodiment, a plurality of convex portions 28 (convexities or ribs) protruding from the bottom surface 211 of the concave portion 21 are formed, the first detection electrode 711 is disposed on the bottom surface 211 so as to surround the convex portion 28, and the second detection electrodes 712 are disposed on the top surface (upper surface) of the plurality of convex portions 28. With such a configuration, the relationship of G'>G" can be satisfied with a simple configuration.

The plurality of second detection electrodes 712 can be independently selected to be in a first state where each second detection electrode 712 is electrically connected to the first detection electrode 711 and a second state in which each second detection electrode 712 is not electrically connected to the first detection electrode 711. The number and place of the second detection electrodes 712 to be in the first state is selected so as to make it possible to change the inclination of the pseudo principal surface 710' with respect to the X-axis direction and align the inclination of the pseudo principal surface 710' with the oblique vibration direction Dm of the electrode 441A. As a result, the quadrature signals can be more reliably reduced.

As described above, the physical quantity sensor 1 of the second embodiment includes the substrate 2 disposed so as to face the movable body 4A. The substrate 2 includes the bottom surface 211 (principal surface) of the concave portion 21 facing the movable body 4A and convex portions 28 provided on the bottom surface 211. The first detection electrode 711 is disposed on the bottom surface 211, and the second detection electrode 712 is disposed on the top surface of the convex portions 28. With this configuration, the separation distance G' between the movable body 4A and the first detection electrode 711 and the separation distance G" between the movable body 4A and the second detection electrode 712 can be made different with a simple configuration.

Even with the second embodiment as described above, the same effects as those of the first embodiment described above can be exhibited.

Third Embodiment

Next, a physical quantity sensor device according to a third embodiment of the invention will be described.

Figure 18:
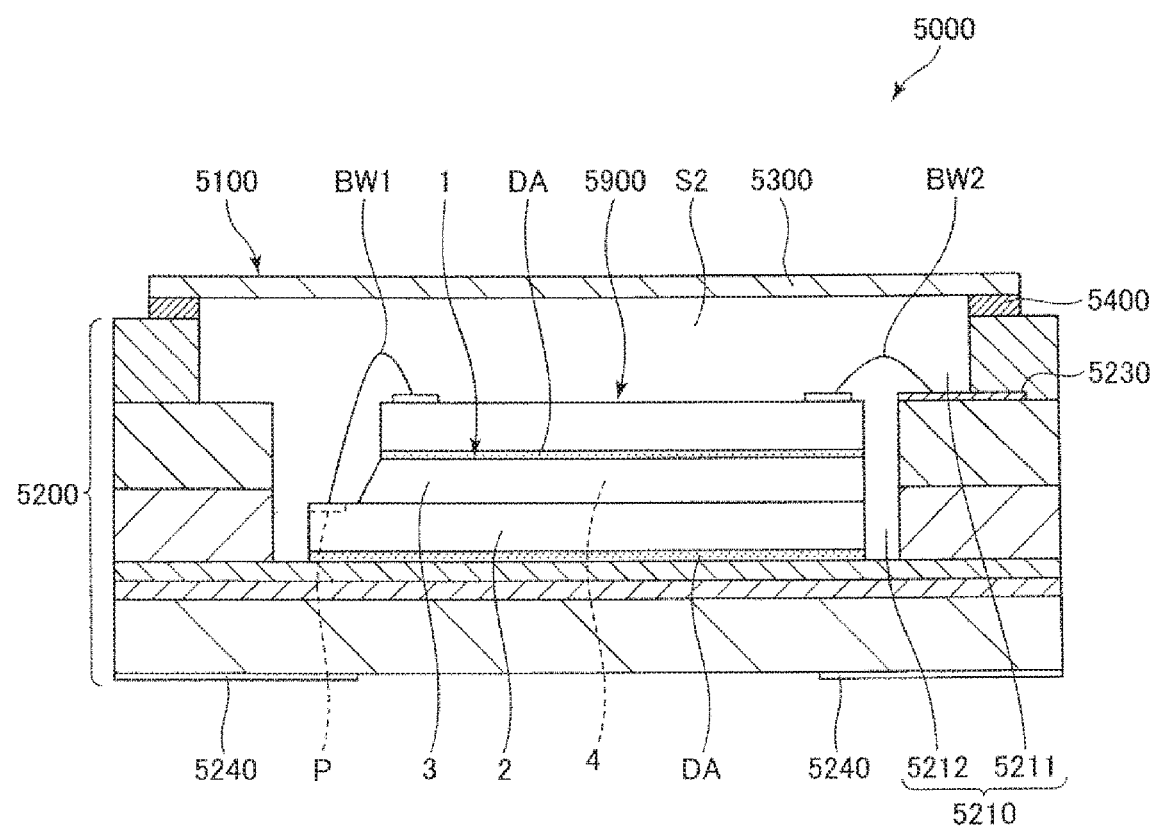
FIG. 18 is a cross-sectional view illustrating a physical quantity sensor device according to a third embodiment of the invention.

FIG. 18 is a cross-sectional view illustrating a physical quantity sensor device according to a third embodiment of the invention.

As illustrated in FIG. 18, a physical quantity sensor device 5000 includes the physical quantity sensor 1, a semiconductor element 5900 (circuit element), and a package 5100 that accommodates the physical quantity sensor 1 and the semiconductor element 5900.

The package 5100 includes a cavity-shaped base 5200 and a lid body 5300 bonded to the upper surface of the base 5200. The base 5200 has a concave portion 5210 which is open to its upper surface. The concave portion 5210 includes a first concave portion 5211 which is open to the upper surface of the base 5200 and a second concave portion 5212 which is open to the bottom surface of the first concave portion 5211.

On the other hand, the lid body 5300 has a plate shape and is bonded to the upper surface of the base 5200 so as to close the opening of the concave portion 5210. As such, the opening of the concave portion 5210 is closed with the lid body 5300 such that an accommodation space S2 is formed in the package 5100 and the physical quantity sensor 1 and the semiconductor element 5900 are accommodated in the accommodation space S2. The method of bonding the base 5200 and the lid body 5300 is not particularly limited, and seam welding via a seam ring 5400 is used in the third embodiment.

The accommodation space S2 is air-tightly sealed. Although an atmosphere in the accommodation space S2 is not particularly limited, for example, it is preferable that the atmosphere is the same as that of the accommodation space S of the physical quantity sensor 1. With this configuration, even if airtightness of the accommodation space S collapses and the accommodation spaces S and S2 communicate with each other, the atmosphere in the accommodation space S can be maintained as it is. For that reason, it is possible to reduce the change in detection characteristics of the physical quantity sensor 1 due to the change in the atmosphere of the storage space S and to exhibit stable detection characteristics.

The constituent material of the base 5200 is not particularly limited, and various ceramics such as alumina, zirconia, titania, and the like can be used, for example. The constituent material of the lid body 5300 is not particularly limited, but it may be a member having a linear expansion coefficient close to that of the constituent material of the base 5200. For example, in a case where the constituent material of the base 5200 is ceramics as described above, it is preferable to use an alloy such as kovar.

The base 5200 includes a plurality of internal terminals 5230 disposed in the accommodation space S2 (bottom surface of the first concave portion 5211) and a plurality of external terminals 5240 disposed on the bottom surface. Each internal terminal 5230 is electrically connected to a predetermined external terminal 5240 via internal wiring (not illustrated) disposed in the base 5200.

The physical quantity sensor 1 is fixed to the bottom surface of the concave portion 5210 via a die attach material DA. Further, a semiconductor element 5900 is disposed on the upper surface of the physical quantity sensor 1 via the die attach material DA. The physical quantity sensor 1 and the semiconductor element 5900 are electrically connected via a bonding wire BW1, and the semiconductor element 5900 and the internal terminal 5230 are electrically connected via a bonding wire BW2.

Further, in the semiconductor element 5900, for example, a drive circuit for applying a drive voltage to the sensor element 4, a detection circuit for measuring the angular velocity ωy based on the output from the sensor element 4, and an output circuit for converting a signal from the detection circuit into a predetermined signal and outputting the signal, and the like are included as necessary.

The physical quantity sensor device 5000 has been described as above. Such a physical quantity sensor device 5000 includes the physical quantity sensor 1 and the semiconductor element 5900 (circuit element). For that reason, it is possible to obtain the effect of the physical quantity sensor 1 and to obtain the physical quantity sensor device 5000 with high reliability.

Fourth Embodiment

Next, a composite sensor device according to a fourth embodiment of the invention will be described.

Figure 19:
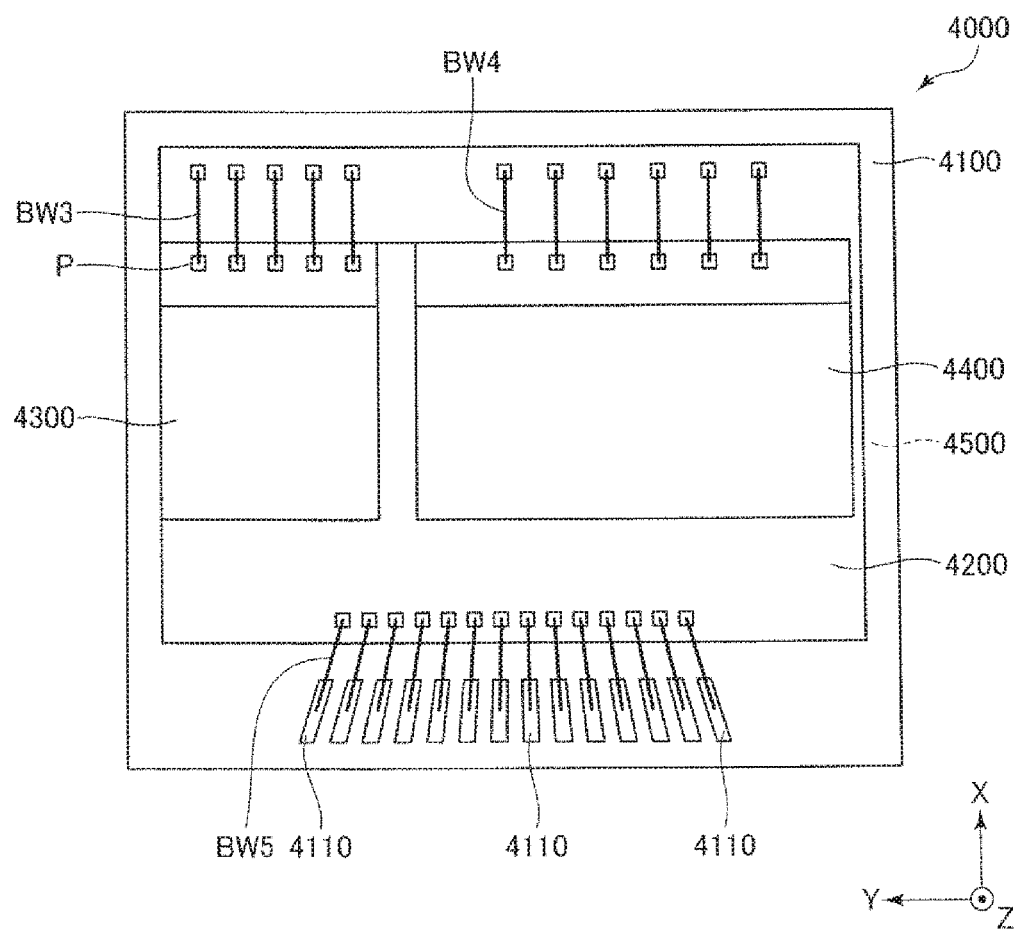
FIG. 19 is a plan view illustrating a composite sensor device according to a fourth embodiment of the invention.
Figure 20:
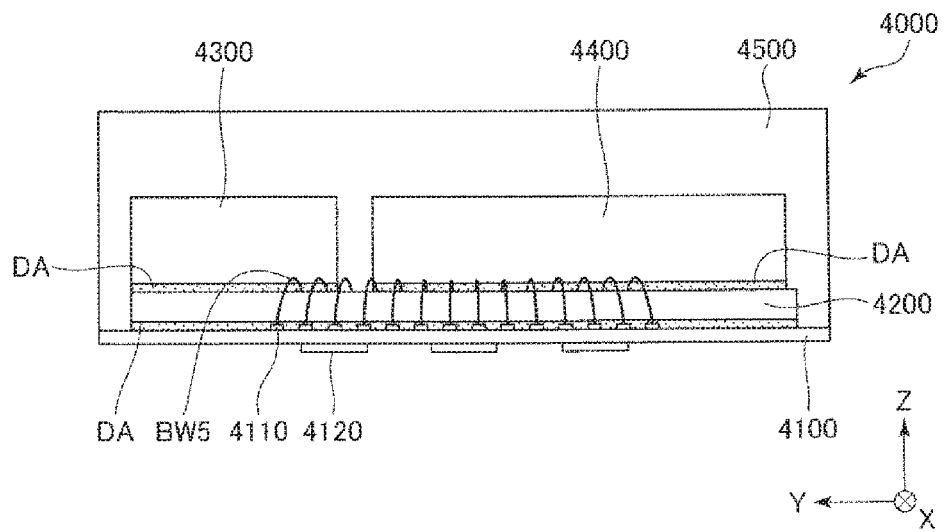
FIG. 20 is a cross-sectional view of the composite sensor device illustrated in FIG. 19.

FIG. 19 is a plan view illustrating a composite sensor device according to a fourth embodiment of the invention. FIG. 20 is a cross-sectional view of the composite sensor device illustrated in FIG. 19.

As illustrated in FIGS. 19 and 20, the composite sensor device 4000 includes a base substrate 4100, a semiconductor element 4200 (circuit element) attached to the top surface of the base substrate 4100 via the die attach material DA (resin adhesive), an acceleration sensor 4300 (second physical quantity sensor) and an angular velocity sensor 4400 (first physical quantity sensor) attached to the upper surface of the semiconductor element 4200 via the die attach material, and a resin package 4500 covering the semiconductor element 4200, the acceleration sensor 4300, and the angular velocity sensor 4400. The acceleration sensor 4300 is a triaxial acceleration sensor that can independently measure accelerations of three axes (X-axis, Y-axis, and Z-axis) orthogonal to each other. The angular velocity sensor 4400 is a triaxial angular velocity sensor that can independently measure angular velocities of three axes (X-axis, Y-axis, and Z-axis) orthogonal to each other. As the acceleration sensor 4300 and the angular velocity sensor 4400, the physical quantity sensor 1 according to the invention can be applied.

The base substrate 4100 includes a plurality of connection terminals 4110 on the upper surface thereof and a plurality of external terminals 4120 on the lower surface thereof. Each connection terminal 4110 is electrically connected to a corresponding external terminal 4120 via an internal wiring or the like (not illustrated) disposed in the base substrate 4100. The semiconductor element 4200 is disposed on the upper surface of the base substrate 4100.

In the semiconductor element 4200, a drive circuit for driving the acceleration sensor 4300 and the angular velocity sensor 4400, an acceleration detection circuit for independently measuring the acceleration in the X-axis direction, the acceleration in the Y-axis direction, and the acceleration in the Z-axis direction based on the output from the acceleration sensor 4300, an angular velocity detection circuit for independently measuring the angular velocity around the X-axis, the angular velocity around the Y-axis, and the angular velocity around the Z-axis based on the output from the angular velocity sensor 4400, an output circuit for converting signals from the acceleration detection circuit and the angular velocity detection circuit into predetermined signals and outputting the signals, and the like are included as necessary.

Such a semiconductor element 4200 is electrically connected to the acceleration sensor 4300 via a bonding wire BW3, is electrically connected to the angular velocity sensor 4400 via a bonding wire BW4, and is electrically connected to the connection terminal 4110 of the base substrate 4100 via a bonding wire BW5. On the upper surface of the semiconductor element 4200, the acceleration sensor 4300 and the angular velocity sensor 4400 are disposed side by side.

The composite sensor device 4000 has been described as above. As described above, such a composite sensor device 4000 includes the angular velocity sensor 4400 (first physical quantity sensor) and the acceleration sensor 4300 (second physical quantity sensor) for detecting a physical quantity different from that of the angular velocity sensor 4400. With this configuration, different types of physical quantities can be detected and a highly convenient composite sensor device 4000 is obtained. In particular, in the fourth embodiment, the first physical quantity sensor is the angular velocity sensor 4400 capable of measuring an angular velocity, and the second physical quantity sensor is an acceleration sensor 4300 capable of measuring acceleration. For that reason, the composite sensor device can be suitably used, for example, for a motion sensor or the like, and it becomes an extremely convenient composite sensor device 4000.

The disposition of the acceleration sensor 4300 and the angular velocity sensor 4400 is not particularly limited, and for example, the acceleration sensor 4300 and the angular velocity sensor 4400 may be attached to the upper surface of the base substrate 4100 so as to sandwich the semiconductor element 4200 therebetween. With such a configuration, it is possible to achieve reduction in height of the composite sensor device 4000. As described above, in the fourth embodiment, although the angular velocity sensor 4400 is the first physical quantity sensor and the acceleration sensor 4300 is the second physical quantity sensor, the reverse case may also be adopted. That is, the angular velocity sensor 4400 may be the second physical quantity sensor, and the acceleration sensor 4300 may be the first physical quantity sensor.

Fifth Embodiment

Next, an inertia measurement device according to a fifth embodiment of the invention will be described.

Figure 21:
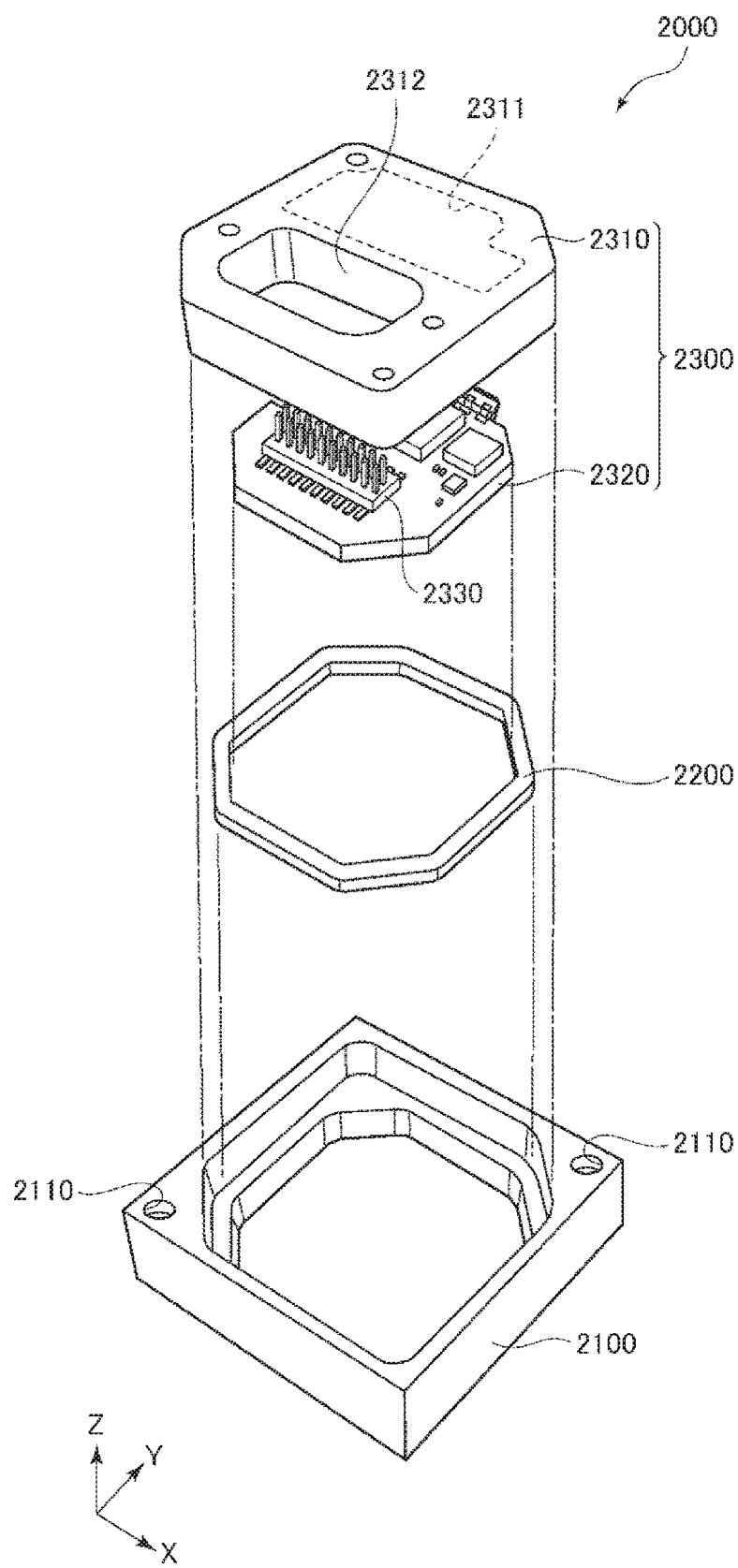
FIG. 21 is an exploded perspective view illustrating an inertia measurement device according to a fifth embodiment of the invention.
Figure 22:
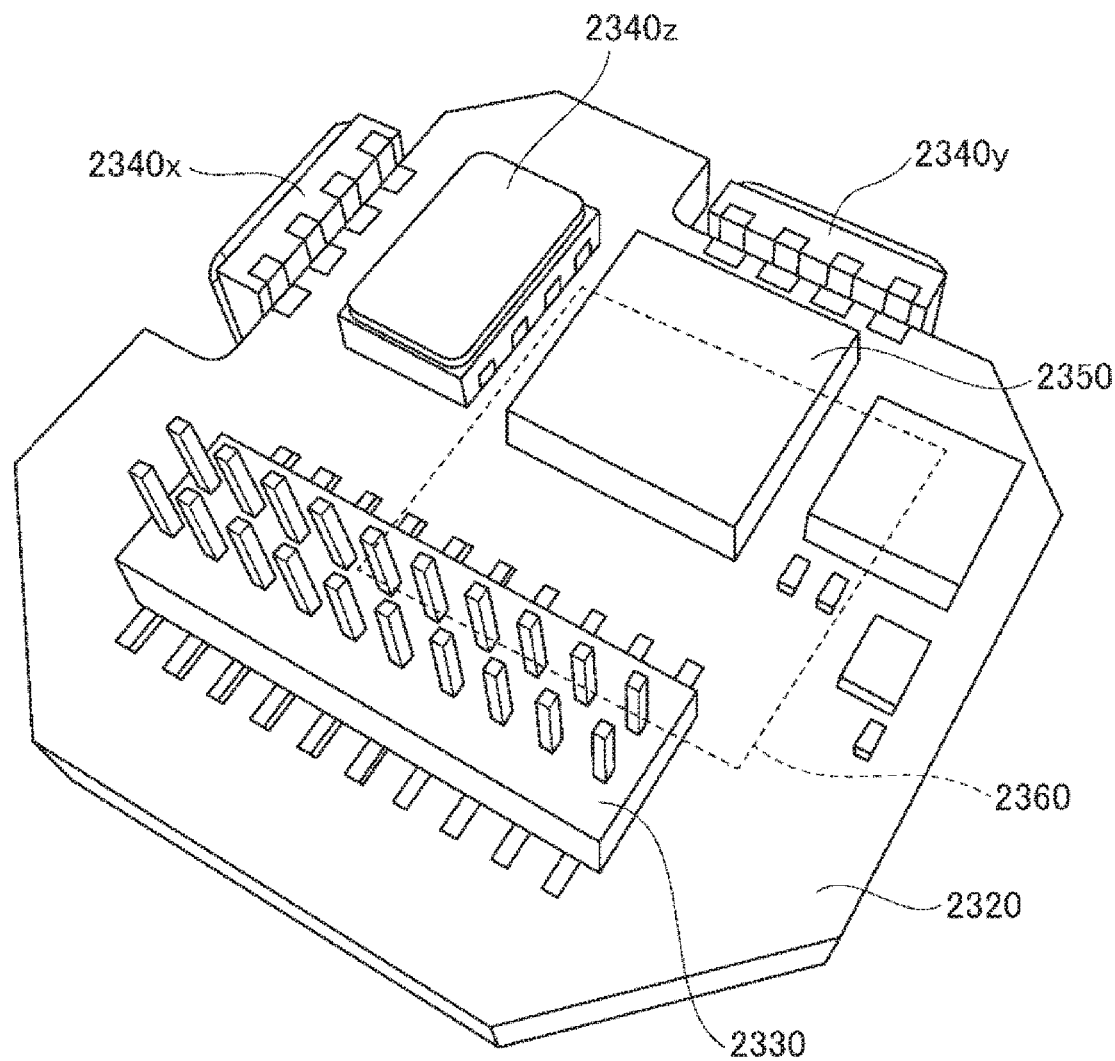
FIG. 22 is a perspective view of a substrate included in the inertia measurement device illustrated in FIG. 21.

FIG. 21 is an exploded perspective view illustrating an inertia measurement device according to the fifth embodiment of the invention. FIG. 22 is a perspective view of the substrate included in the inertia measurement device illustrated in FIG. 21.

The inertia measurement device 2000 (IMU: Inertia measurement Unit) illustrated in FIG. 21 is an inertia measurement device that detects the attitude and behavior (inertial momentum) of a vehicle (mounted device) such as an automobile or a robot. The inertia measurement device 2000 functions as a so-called six-axis motion sensor including three-axis acceleration sensors and three-axis angular velocity sensors.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced such that the device can be mounted on a smartphone or a digital camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Further, the sensor module 2300 includes an inner case 2310 and a substrate 2320.

Similarly to the overall shape of the inertia measurement device 2000 described above, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

The inner case 2310 is a member for supporting the substrate 2320, and has a shape so as to fit inside the outer case 2100. A concave portion 2311 for preventing contact with the substrate 2320 and an opening 2312 for exposing a connector 2330 described later are formed in the inner case 2310. Such an inner case 2310 is bonded to the outer case 2100 via the bonding member 2200 (for example, a packing impregnated with adhesive). The substrate 2320 is bonded to the lower surface of the inner case 2310 via an adhesive.

As illustrated in FIG. 22, a connector 2330, an angular velocity sensor 2340z for measuring the angular velocity around the Z-axis, an acceleration sensor 2350 for measuring acceleration in each axis directions of the X-axis, the Y-axis, and the Z-axis and the like are mounted on the upper surface of the substrate 2320. An angular velocity sensor 2340x for measuring the angular velocity about the X-axis and an angular velocity sensor 2340y for measuring the angular velocity around the Y-axis are mounted on the side surface of the substrate 2320. As these sensors 2340z, 2340x, 2340y, and 2350, the physical quantity sensor 1 of can be applied.

A control IC 2360 is mounted on the lower surface of the substrate 2320. The control IC 2360 is a micro controller unit (MCU), which includes a storing unit including a nonvolatile memory, an A/D converter, and the like, and controls each unit of the inertia measurement device 2000. In the storing unit, programs defining the order and contents for measuring the acceleration and angular velocity, programs for digitizing detected data and incorporating the detected data into packet data, accompanying data, and the like are stored. A plurality of electronic components are mounted on the substrate 2320 in addition to the control IC 2360.

The inertia measurement device 2000 has been described as above. Such an inertia measurement device 2000 includes the angular velocity sensors 2340z, 2340x, and 2340y and the acceleration sensors 2350 as the physical quantity sensor, and the control IC 2360 (control circuit) for controlling driving of each of these sensors 2340z, 2340x, 2340y, and 2350. With this configuration, the effect of the physical quantity sensor according to the invention can be achieved, and the inertia measurement device 2000 with high reliability can be obtained.

Sixth Embodiment

Next, a vehicle positioning device according to a sixth embodiment of the invention will be described.

Figure 23:
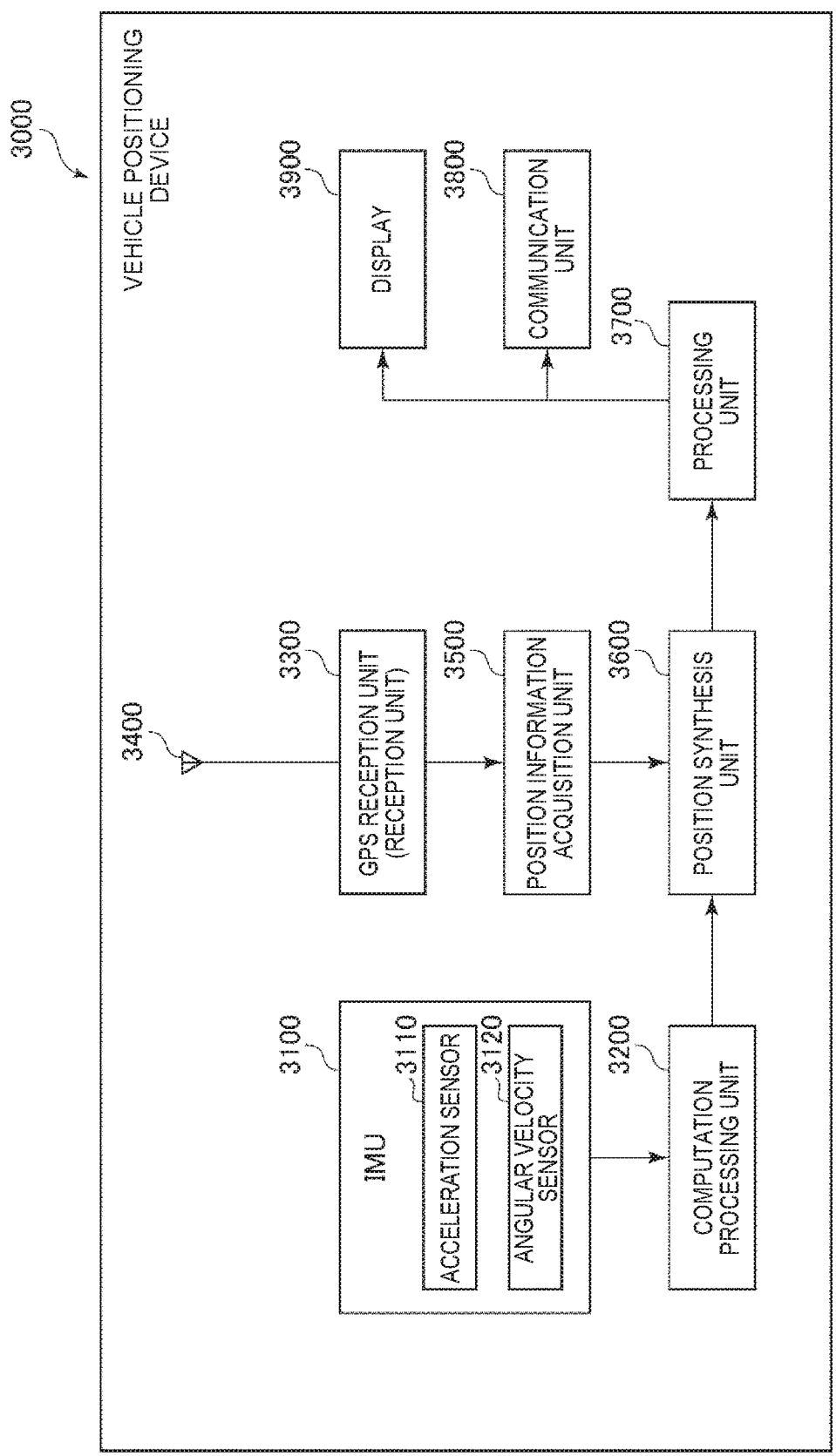
FIG. 23 is a block diagram illustrating the entire system of a vehicle positioning device according to a sixth embodiment of the invention.
Figure 24:
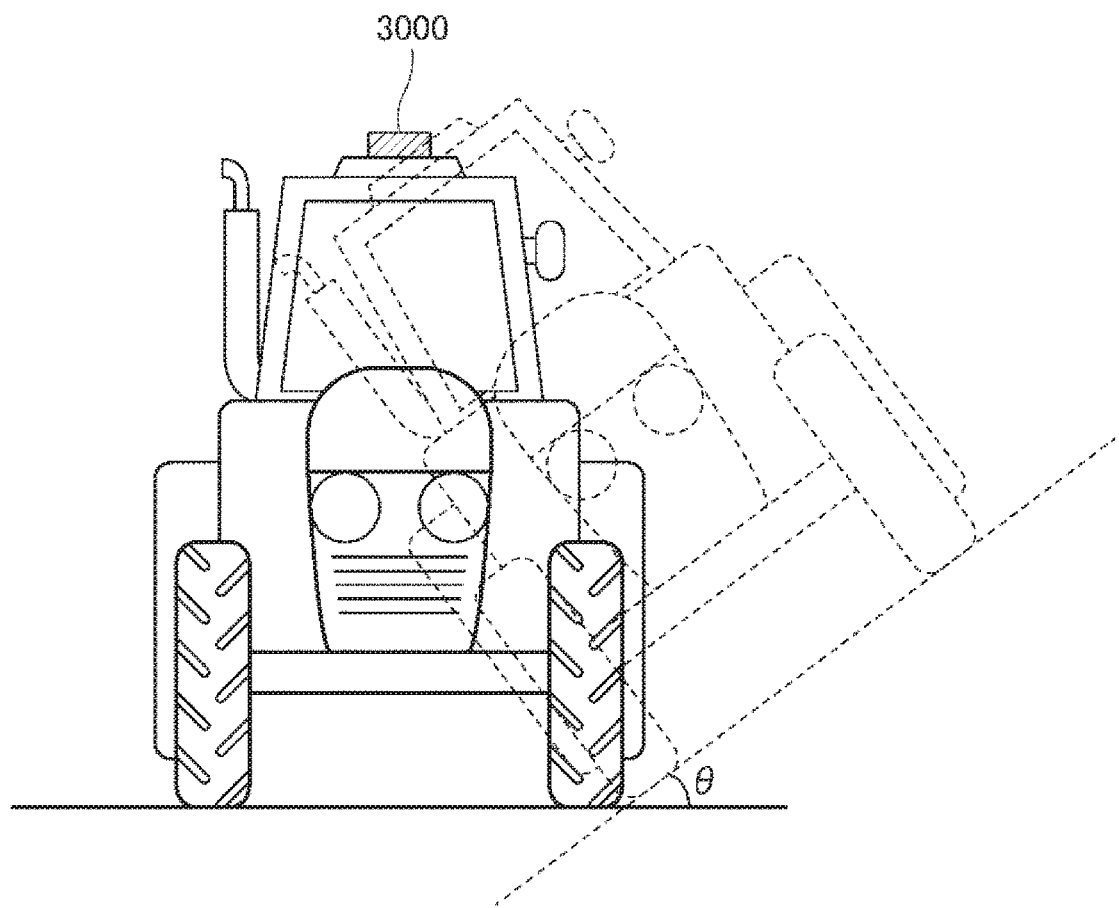
FIG. 24 is a diagram illustrating an action of the vehicle positioning device illustrated in FIG. 23.

FIG. 23 is a block diagram illustrating the entire system of a vehicle positioning device according to a sixth embodiment. FIG. 24 is a diagram illustrating the operation of the vehicle positioning device illustrated in FIG. 23.

A vehicle positioning device 3000 illustrated in FIG. 23 is a device which is used by being mounted on a vehicle and performs positioning of the vehicle. The vehicle is not particularly limited, and may be any of a bicycle, an automobile (including a four-wheeled automobile and a motorcycle), a train, an airplane, a ship, and the like, but in the fifth embodiment, the vehicle is described as a four-wheeled automobile. The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 of the fourth embodiment described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data (data including acceleration and attitude of the vehicle).

The GPS reception unit 3300 receives a signal (GPS carrier wave, satellite signal on which position information is superimposed) from the GPS satellite via the receiving antenna 3400. Further, the position information acquisition unit 3500 outputs GPS positioning data representing the position (latitude, longitude, altitude), speed, direction of the vehicle positioning device 3000 (vehicle) based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 24, if the attitude of the vehicle is different due to the influence of inclination of the ground or the like, the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data (in particular, data on the attitude of the vehicle). This determination can be made comparatively easily by computation using a trigonometric function (inclination θ with respect to the vertical direction).

The position data output from the position synthesis unit 3600 is subjected to predetermined processing by the processing unit 3700 and displayed on the display 3900 as a positioning result. Further, the position data may be transmitted to the external device by the communication unit 3800.

The vehicle positioning device 3000 has been described as above. As described above, such a vehicle positioning device 3000 includes the inertia measurement device 3100, the GPS reception unit 3300 (reception unit) that receives a satellite signal on which position information is superimposed from a positioning satellite, the position information acquisition unit 3500 (acquisition unit) that acquires position information of the GPS reception unit 3300 based on the received satellite signal, the computation processing unit 3200 (computation unit) that computes the attitude of the vehicle based on the inertial navigation positioning data (inertia data) output from the inertia measurement device 3100, and the position synthesis unit 3600 (calculation unit) that calculates the position of the vehicle by correcting position information based on the calculated attitude. With this configuration, the effect of the inertia measurement device 2000 described above can be achieved, and the vehicle positioning device 3000 with high reliability can be obtained.

Seventh Embodiment

Next, an electronic apparatus according to a seventh embodiment of the invention will be described.

Figure 25:
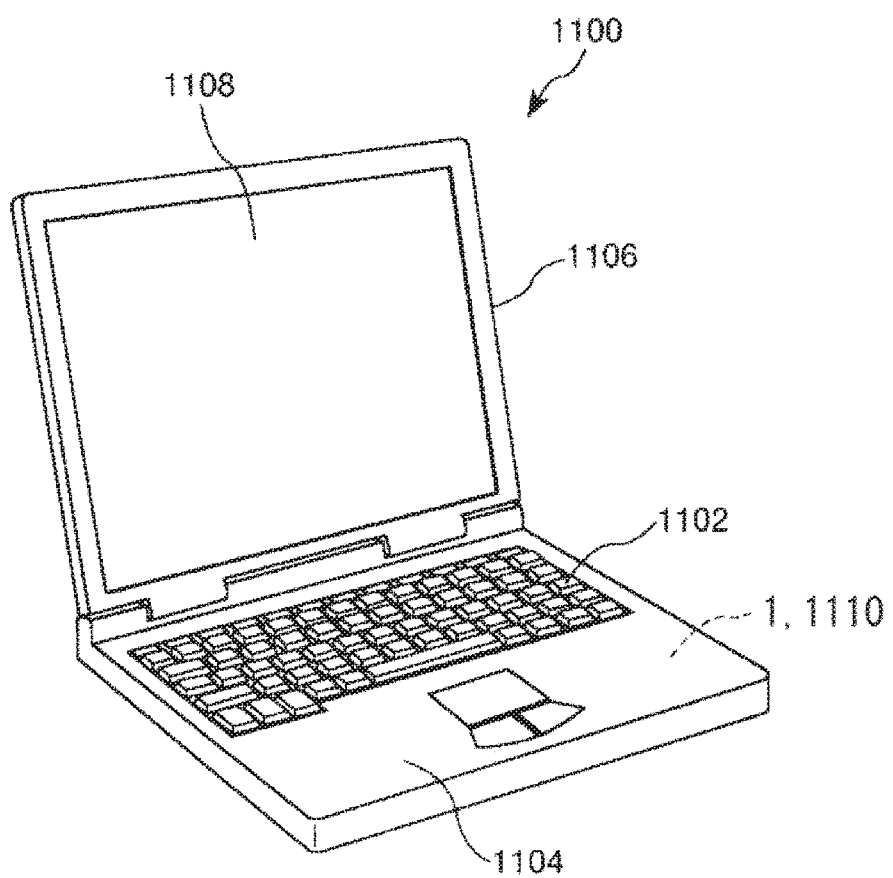
FIG. 25 is a perspective view illustrating an electronic apparatus according to a seventh embodiment of the invention.

FIG. 25 is a perspective view illustrating an electronic apparatus according to a seventh embodiment of the invention.

The mobile type (or notebook type) personal computer 1100 illustrated in FIG. 25 is a personal computer to which the electronic apparatus according to the invention is applied. The personal computer 1100 is constituted with a main body 1104 including a keyboard 1102 and a display unit 1106 including a display 1108, and the display unit 1106 is supported so as to be rotatable with respect to the main body 1104 via a hinge structure. In the personal computer 1100, the physical quantity sensor 1 and the control circuit 1110 (control unit) that performs control based on detection signals output from the physical quantity sensor 1 are incorporated.

Such a personal computer 1100 (electronic apparatus) includes the physical quantity sensor 1 and the control circuit 1110 (control unit) that performs control based on detection signals output from the physical quantity sensor 1. For that reason, the effect of the physical quantity sensor 1 described above can be achieved and high reliability can be exhibited.

Eighth Embodiment

Next, an electronic apparatus according to an eighth embodiment of the invention will be described.

Figure 26:
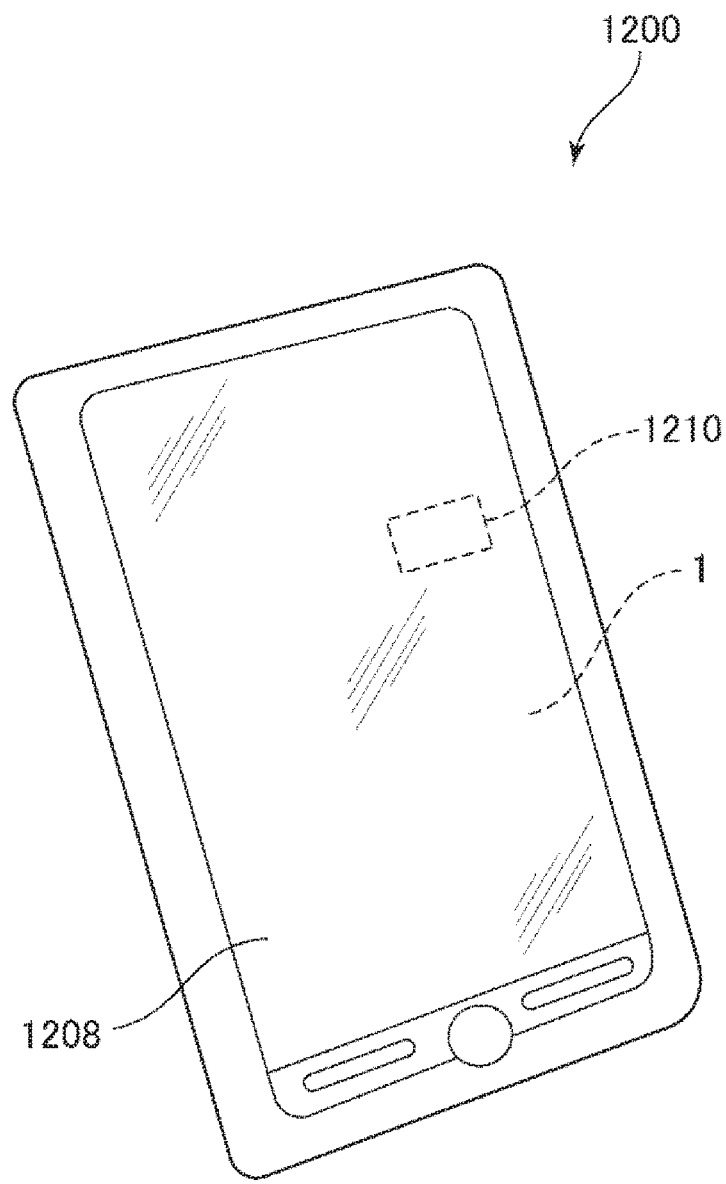
FIG. 26 is a perspective view illustrating an electronic apparatus according to an eighth embodiment of the invention.

FIG. 26 is a perspective view illustrating an electronic apparatus according to the eighth embodiment of the invention.

A smartphone 1200 (mobile phone) illustrated in FIG. 26 is one to which the electronic apparatus according to the invention is applied. In the smartphone 1200, the physical quantity sensor 1 and the control circuit 1210 (control unit) that performs control based on detection signals output from the physical quantity sensor 1 are incorporated. Detection data (angular velocity data) measured by the physical quantity sensor 1 is transmitted to the control circuit 1210, and the control circuit 1210 can recognize the attitude and behavior of the smartphone 1200 from the received detection data, change a display image displayed on the display unit 1208, generate an alarm sound or sound effect, or drive the vibration motor to vibrate the main body.

Such a smartphone 1200 (electronic apparatus) includes the physical quantity sensor 1 and the control circuit 1210 (control unit) that performs control based on detection signals output from the physical quantity sensor 1. For that reason, the effect of the physical quantity sensor 1 described above can be achieved, and high reliability can be exhibited.

Ninth Embodiment

Next, an electronic apparatus according to a ninth embodiment of the invention will be described.

Figure 27:
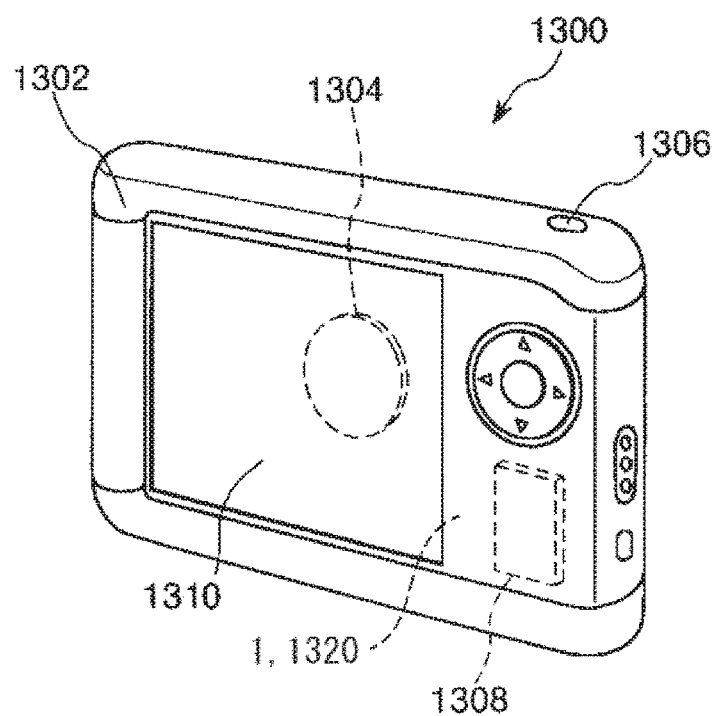
FIG. 27 is a perspective view illustrating an electronic apparatus according to a ninth embodiment of the invention.

FIG. 27 is a perspective view illustrating an electronic apparatus according to the ninth embodiment of the invention.

A digital still camera 1300 illustrated in FIG. 27 is one to which the electronic apparatus according to the invention is applied. The digital still camera 1300 includes a case 1302, and a display 1310 is provided on the back surface of the case 1302. The display 1310 is configured to perform display based on the image capturing signal by the CCD, and functions as a finder that displays the subject as an electronic image. A light receiving unit 1304 including an optical lens (image capturing optical system), a CCD, and the like is provided on the front side (the back side in the figure) of the case 1302. When a photographer confirms the subject image displayed on the display 1310 and presses a shutter button 1306, the image capturing signal of the CCD at that time is transferred and stored in the memory 1308. In the digital still camera 1300, the physical quantity sensor 1 and a control circuit 1320 (control unit) that performs control based on detection signals output from the physical quantity sensor 1 are incorporated. The physical quantity sensor 1 is used for camera shake correction, for example.

Such a digital still camera 1300 (electronic apparatus) includes the physical quantity sensor 1 and the control circuit 1320 (control unit) that performs control based on detection signals output from the physical quantity sensor 1. For that reason, the effect of the physical quantity sensor 1 described above can be achieved, and high reliability can be exhibited.

In addition to the personal computer and mobile phone of the embodiments described above and the digital still camera of the ninth embodiment, the electronic apparatus according to the invention can be applied to, for example, a smartphone, a tablet terminal, a clock (including smart watch), an ink jet type discharging device (for example, an ink jet printer), a laptop personal computer, a TV, a wearable terminals such as HMD (head mounted display), a video camera, a video tape recorder, a car navigation device, a pager, an electronic datebook (including a datebook with communication function), an electronic dictionary, a calculator, an electronic game machines, a word processor, a work station, a videophone, a security TV monitor, an electronic binoculars, a POS terminal, medical equipment (for example, electronic clinical thermometer, blood pressure monitor, blood glucose meter, electrocardiogram measurement device, ultrasonic diagnostic device, electronic endoscope), a fish finder, various measuring instruments, mobile terminal base station equipment, instruments (for example, instruments of vehicles, aircraft, and ships), a flight simulator, a network server, and the like.

Tenth Embodiment

Next, a portable electronic device according to a tenth embodiment of the invention will be described.

Figure 28:
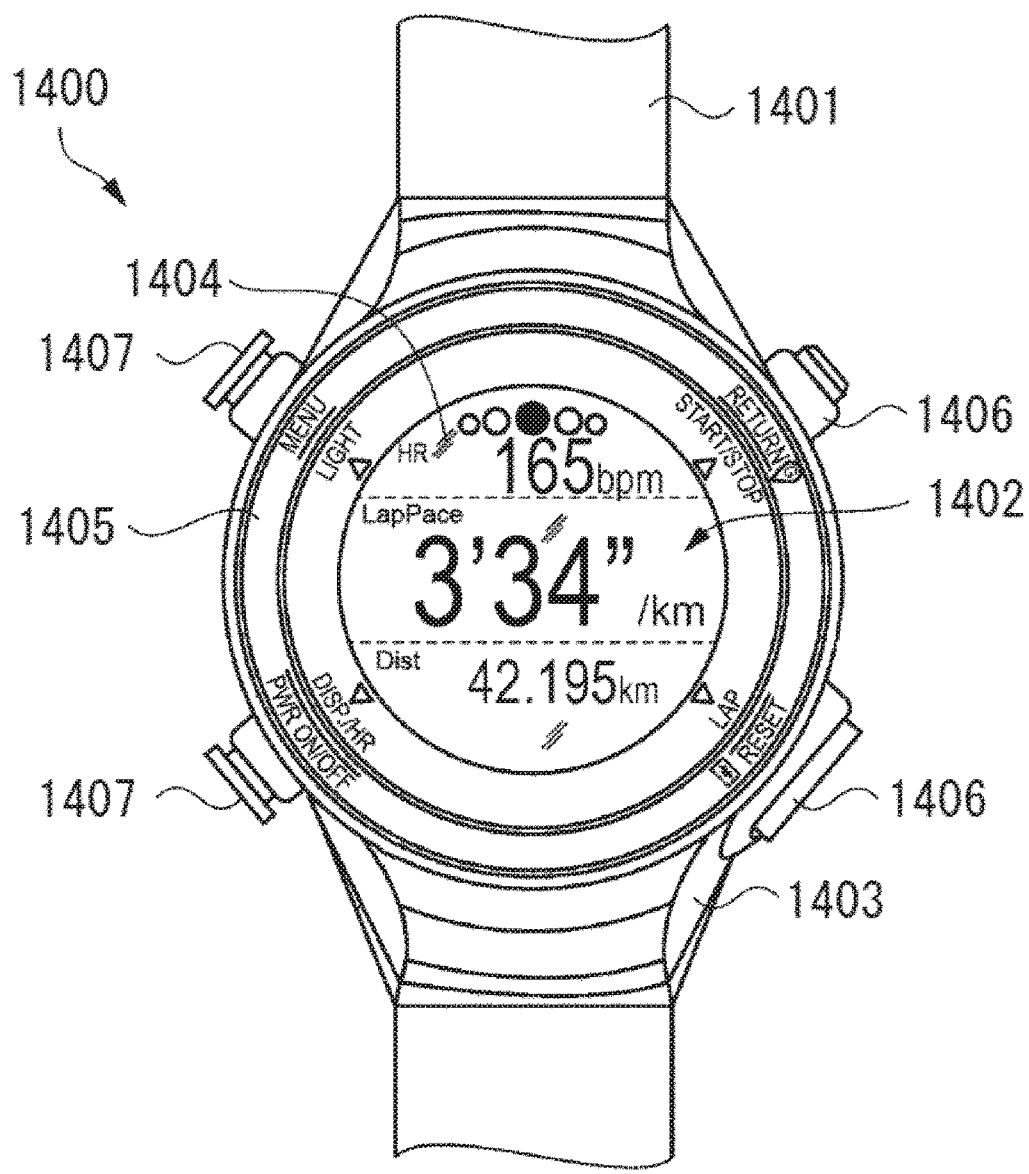
FIG. 28 is a plan view illustrating a portable electronic device according to a tenth embodiment of the invention.
Figure 29:
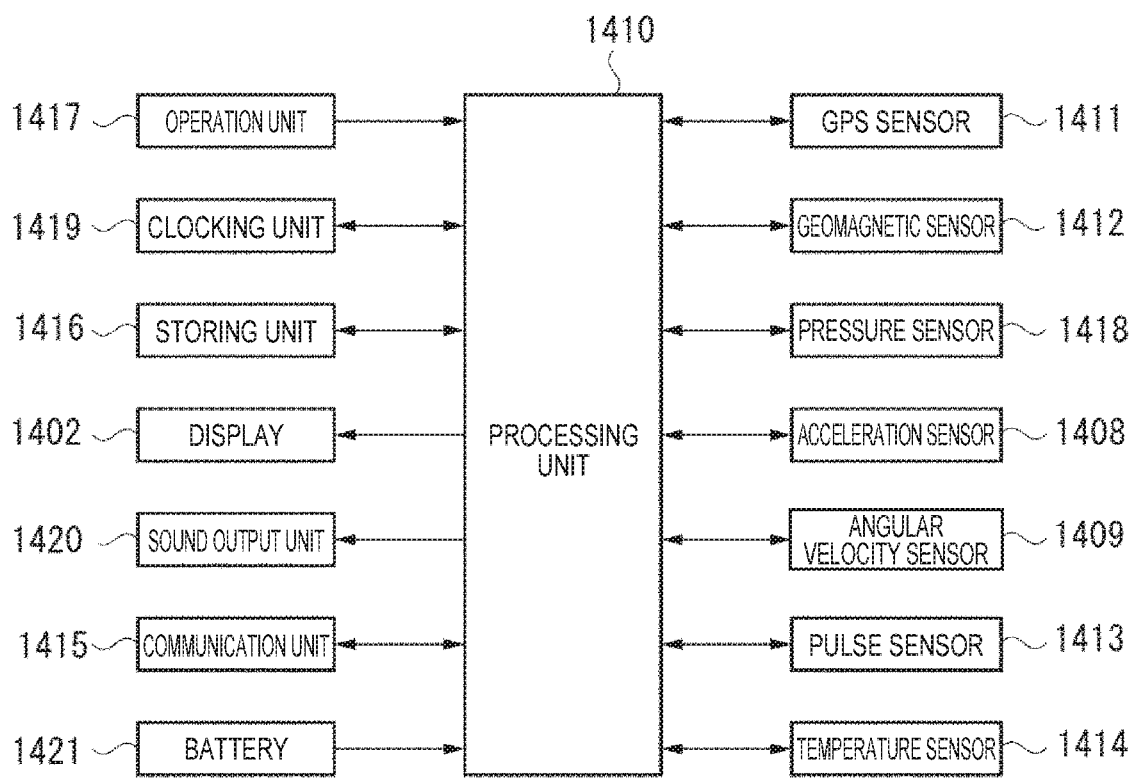
FIG. 29 is a functional block diagram illustrating a schematic configuration of the portable electronic device illustrated in FIG. 28.

FIG. 28 is a plan view illustrating a portable electronic device according to a tenth embodiment of the invention. FIG. 29 is a functional block diagram illustrating a schematic configuration of the portable electronic device illustrated in FIG. 28.

A watch type activity meter 1400 (active tracker) illustrated in FIG. 28 is a wristwatch device to which the portable electronic device according to the invention is applied. The activity meter 1400 is attached to a part (subject) such as the user's wristwatch by a band 1401. The activity meter 1400 includes a display 1402 for digital display and can perform wireless communication. The physical quantity sensor 1 according to the invention is incorporated in the activity meter 1400 as an acceleration sensor 1408 for measuring acceleration and an angular velocity sensor 1409 for measuring angular velocity.

The activity meter 1400 includes a case 1403 in which the acceleration sensor 1408 and the angular velocity sensor 1409 are accommodated, a processing unit 1410 which is accommodated in the case 1403 and is for processing output data from the acceleration sensor 1408 and the angular velocity sensor 1409, the display 1402 accommodated in the case 1403, and a translucent cover 1404 covering the opening of the case 1403. A bezel 1405 is provided outside the translucent cover 1404. A plurality of operation buttons 1406 and 1407 are provided on the side surface of the case 1403.

As illustrated in FIG. 29, the acceleration sensor 1408 measures acceleration in each of the three axis directions which intersect (ideally orthogonal to) each other, and outputs a signal (acceleration signal) according to the magnitude and direction of the detected three-axis acceleration. An angular velocity sensor 1409 measures angular velocity in each of the three axis directions intersecting (ideally orthogonal to) each other, and outputs a signal (angular velocity signal) according to the magnitude and direction of the detected three-axis angular velocity.

In the liquid crystal display (LCD) constituting the display 1402, depending on various detection modes, for example, position information using a GPS sensor 1411 and a geomagnetic sensor 1412, exercise information such as the amount of movement, the amount of exercise using the acceleration sensor 1408 and the angular velocity sensor 1409, biometric information such as a pulse rate using a pulse sensor 1413 or the like, and time information such as current time, and the like are displayed. The environmental temperature using a temperature sensor 1414 can also be displayed.

A communication unit 1415 performs various controls for establishing communication between a user terminal and an information terminal (not illustrated). The communication unit 1415 is configure to include a transceiver compatible with the short range wireless communication standard such as, for example, a Bluetooth (registered trademark) (including BTLE: Bluetooth Low Energy), Wireless Fidelity (Wi-Fi) (registered trademark), Zigbee (registered trademark), near field communication (NFC), ANT+(registered trademark) or the like, and a connector compatible with a communication bus standard such as the universal serial bus (USB) or the like.

The processing unit 1410 (processor) is constituted by, for example, a micro processing unit (MPU), a digital signal processor (DSP), an application specific integrated circuit (ASIC), or the like. The processing unit 1410 executes various processing based on the program stored in a storing unit 1416 and a signal input from an operation unit 1417 (for example, operation buttons 1406 and 1407). Processing by the processing unit 1410 includes data processing for each output signal of the GPS sensor 1411, the geomagnetic sensor 1412, a pressure sensor 1418, the acceleration sensor 1408, the angular velocity sensor 1409, the pulse sensor 1413, the temperature sensor 1414, and the clocking unit 1419, display processing for causing the display 1402 to display an image, sound output processing for causing a sound output unit 1420 to output sound, communication processing for performing communication with the information terminal via the communication unit 1415, and Power control processing for supplying power from a battery 1421 to each unit, and the like.

Such an activity meter 1400 can have at least the following functions.

1. Distance: Measure the total distance from the start of measurement with highly accurate GPS function.
2. Pace: Display a current running pace from pace distance measurement.
3. Average speed: Calculate an average speed and display the average speed from the start of running to the present.
4. Altitude: Measure and display altitude with GPS function.
5. Stride: Measure and display the stride even in a tunnel where GPS radio waves do not reach.
6. Pitch: Measure and display the number of steps per minute.
7. Heart rate: The heart rate is measured and displayed by the pulse sensor.
8. Gradient: Measure and display the gradient of the ground in training and trail runs in the mountains.
9. Auto lap: Automatically perform lap measurement when running for a fixed distance set in advance or for a fixed time.
10. Exercise consumption calorie: Display calorie consumption.
11. Step count: Display the total number of steps from the start of the exercise.

Such an activity meter 1400 (portable electronic device) includes the physical quantity sensor 1, the case 1403 accommodating the physical quantity sensor 1, the processing unit 1410 which is accommodated in the case 1403 and performs processing output data from the physical quantity sensor 1, the display 1402 accommodated in the case 1403, and the translucent cover 1404 covering the opening portion of the case 1403. For that reason, the effect of the physical quantity sensor 1 described above can be achieved and high reliability can be exhibited.

As described above, the activity meter 1400 includes the GPS sensor 1411 (satellite positioning system), and can measure a moving distance and a movement trajectory of the user. For that reason, a highly convenient activity meter 1400 can be obtained.

The activity meter 1400 can be widely applied to a running watch, a runner's watch, a runner's watch for multiple sports such as duathlon and triathlon, an outdoor watch, and a GPS watch equipped with a satellite positioning system such as the GPS.

In the above description, although description is made by using the global positioning system (GPS) as a satellite positioning system, other global navigation satellite system (GNSS) may be used. For example, one or more of satellite positioning systems among satellite positioning systems such as European geostationary-satellite navigation overlay service (EGNOS), quasi zenith satellite system (QZSS), global navigation satellite system (GLONASS), GALILEO, beidou navigation satellite system (Bei Dou) may be used. Also, a stationary satellite type satellite-based augmentation system (SBAS) such as wide area augmentation system (WAAS) or European geostationary-satellite navigation overlay service (EGNOS) may be utilized in at least one of the satellite positioning systems.

Eleventh Embodiment

Next, a vehicle according to an eleventh embodiment of the invention will be described.

Figure 30:
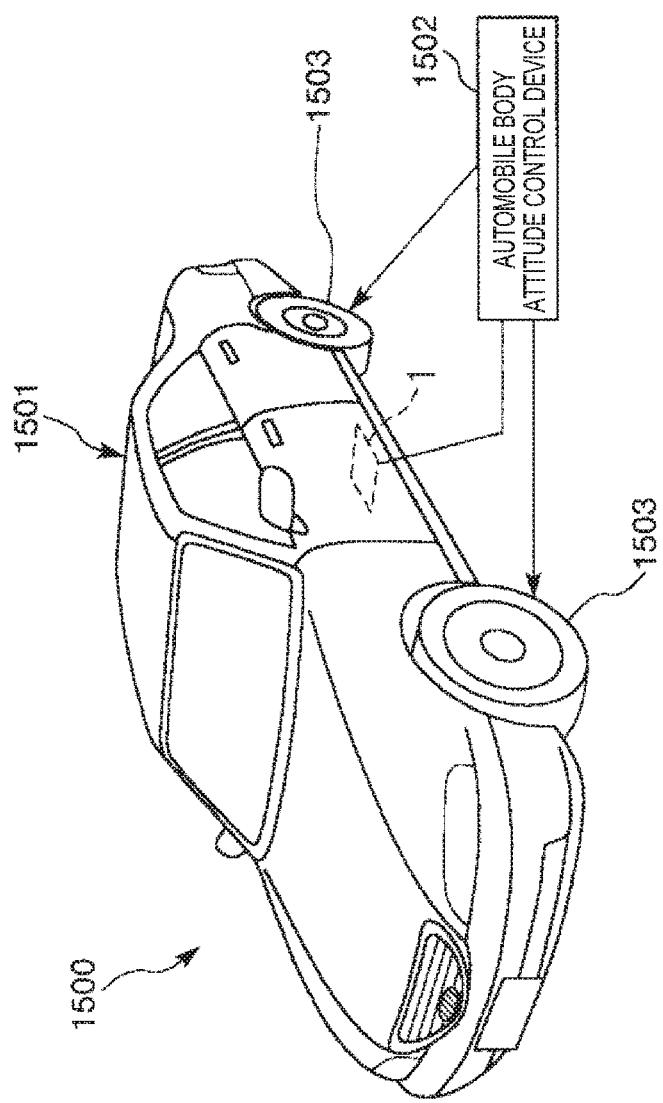
FIG. 30 is a perspective view illustrating a vehicle according to an eleventh embodiment of the invention.

FIG. 30 is a perspective view illustrating a vehicle according to the eleventh embodiment of the invention.

An automobile 1500 illustrated in FIG. 30 is an automobile to which the vehicle according to the invention is applied. In this figure, the automobile 1500 includes at least one system 1510 of an engine system, a brake system, and a keyless entry system. The physical quantity sensor 1 is incorporated in the automobile 1500, and the attitude of the vehicle body 1501 can be measured by the physical quantity sensor 1. The detection signal of the physical quantity sensor 1 is supplied to the control device 1502, and the control device 1502 can control the system 1510 based on the signal.

Such an automobile 1500 (vehicle) includes the physical quantity sensor 1 and the control device 1502 (control unit) that performs control based on the detection signal output from the physical quantity sensor 1. For that reason, the effect of the physical quantity sensor 1 described above can be achieved, and high reliability can be exhibited. The automobile 1500 includes at least one of an engine system, a brake system, and the keyless entry system 1510, and the control device 1502 controls the system 1510 based on the detection signal. With this configuration, the system 1510 can be accurately controlled.

In addition, the physical quantity sensor 1 can also be widely applied to a car navigation system, a car air conditioner, an anti-lock braking system (ABS), an air bag, a tire pressure monitoring system (TPMS), an engine controller, and an electronic control unit (ECU) such as a battery monitor of a hybrid car or an electric automobile.

Also, the vehicle is not limited to the automobile 1500, but can also be an airplane, a rocket, a satellite, a ship, an automated guided vehicle (AGV), a biped walking robot, an unmanned airplane such as a drone, and the like.

Although the physical quantity sensor, physical quantity sensor device, the composite sensor device, the inertia measurement device, the vehicle positioning device, the portable electronic device, the electronic apparatus, the vehicle, and the output signal adjustment method of the physical quantity sensor according to the invention have been described based on the illustrated embodiments, the invention is not limited thereto. The configuration of each unit can be replaced with any configuration having the same function. In addition, any other constituent element may be added to the invention. Further, the embodiments described above may be appropriately combined.

In the embodiments described above, although the configuration in which the physical quantity sensor measures the angular velocity about the Y-axis has been described, the configuration is not limited thereto, and a configuration in which the angular velocity around the X-axis is measured or a configuration in which the angular velocity around the Z-axis is measured may be available. In the embodiments described above, although the configuration in which the physical quantity sensor measures the angular velocity has been described, the physical quantity to be detected by the physical quantity sensor is not particularly limited, and may be, for example, acceleration, pressure, or the like. The physical quantity sensor may be configured to be able to measure a plurality of physical quantities. The plurality of physical quantities may be physical quantities of the same kind having different detection axes (for example, acceleration in the X-axis direction, acceleration in the Y-axis direction and acceleration in the Z-axis direction, angular velocity around the X-axis, angular velocity around the Y-axis and angular velocity around the Z-axis) or may be different physical quantities (for example, angular velocity around the X-axis and acceleration in the X-axis direction).

The entire disclosure of Japanese Patent Application No. 2018-014735 filed Jan. 31, 2018 is expressly incorporated by reference herein.

What is claimed is:
1. A physical quantity sensor comprising:
a substrate;
a movable body which is disposed to face the substrate in an X-axis direction, the X-axis direction being along an X-axis which is one of three axes that are orthogonal to each other and are the X-axis, a Y-axis and a Z-axis; and
a detection electrode which is provided on the substrate, and is disposed to face the movable body and to be aligned parallel to the Z-axis,
wherein the detection electrode includes a first detection electrode disposed to face the movable body, and a second detection electrode disposed to face the movable body,
a separation distance between the movable body and the second detection electrode is greater than a separation distance between the movable body and the first detection electrode,
vibration of the movable body has a drive vibration mode in which vibration parallel to the Z-axis and vibration parallel to the X-axis are combined, and
the detection electrode is divided into a first region and a second region by a straight line parallel to the Y-axis at a midpoint of the detection electrode in a direction parallel to the X-axis, and an area of the second detection electrode included in the first region is different from an area of the second detection electrode included in the second region.

2. The physical quantity sensor according to claim 1, wherein the substrate has a principal surface facing the movable body and a concavity provided in the principal surface,
the first detection electrode is disposed on the principal surface, and
the second detection electrode is disposed on an inner bottom surface of the concavity.

3. The physical quantity sensor according to claim 2, wherein the substrate has a principal surface facing the movable body and a convexity provided on the principal surface,
the first detection electrode is disposed on the principal surface, and
the second detection electrode is disposed on a top surface of the convexity.

4. The physical quantity sensor according to claim 1, further comprising:
a selection circuit that controls a connection state between the first detection electrode and the second detection electrode,
wherein the selection circuit is configured to select a first state in which the first detection electrode and the second detection electrode are electrically connected and a second state in which the first detection electrode and the second detection electrode are not electrically connected.

5. The physical quantity sensor according to claim 4, wherein in the second state, the second detection electrode and the movable body are electrically connected to each other.

6. The physical quantity sensor according to claim 1, wherein the second detection electrode is elongated along the Y-axis.

7. The physical quantity sensor according to claim 1, wherein the detection electrode includes a plurality of the second detection electrodes.

8. The physical quantity sensor according to claim 7, wherein the plurality of second detection electrodes are on both sides of the straight line in a plan view.

9. The physical quantity sensor according to claim 1, wherein an angular velocity around the Y-axis is measured.

10. A physical quantity sensor device comprising:
the physical quantity sensor according to claim 1; and
a circuit element.

11. An electronic apparatus comprising:
the physical quantity sensor according to claim 1; and
a controller that performs control based on a detection signal output from the physical quantity sensor.

12. A vehicle comprising:
the physical quantity sensor according to claim 1; and
a controller that performs control based on a detection signal output from the physical quantity sensor.

13. A physical quantity sensor comprising:
a substrate;
a movable body which is disposed to face the substrate; and
a detection electrode which is provided on the substrate, faces the movable body, and is disposed to be aligned parallel to a Z-axis, the Z-axis being one of three axes that are orthogonal to each other and are an X-axis, a Y-axis, and the Z-axis,
wherein the detection electrode includes a first detection electrode which is disposed to face the movable body and to be aligned parallel to the Z-axis, and a second detection electrode which is disposed to face the movable body and to be aligned parallel to the Z-axis,
a separation distance between the movable body and the second detection electrode is less than a separation distance between the movable body and the first detection electrode,
vibration of the movable body has a drive vibration mode in which vibration parallel to the Z-axis and vibration parallel to the X-axis are combined, and
the detection electrode is divided into a first region and a second region by a straight line parallel to the Y-axis at a midpoint of the detection electrode in a direction parallel to the X-axis, and an area of the second detection electrode included in the first region is different from an area of the second detection electrode included in the second region.

14. The physical quantity sensor according to claim 13, further comprising:
a selection circuit that controls a connection state between the first detection electrode and the second detection electrode,
wherein the selection circuit is configured to select a first state in which the first detection electrode and the second detection electrode are electrically connected and a second state in which the first detection electrode and the second detection electrode are not electrically connected.

15. The physical quantity sensor according to claim 14, wherein in the second state, the second detection electrode and the movable body are electrically connected to each other.

16. The physical quantity sensor according to claim 13, wherein the second detection electrode is elongated along the Y-axis.

17. The physical quantity sensor according to claim 13, wherein the detection electrode includes a plurality of the second detection electrodes.

18. The physical quantity sensor according to claim 17, wherein the plurality of second detection electrodes are on both sides of the straight line in a plan view.

19. The physical quantity sensor according to claim 13, wherein an angular velocity around the Y-axis is measured.

20. An output signal adjustment method of a physical quantity sensor that includes
a substrate,
a movable body disposed to face the substrate in an X-axis direction, the X-axis direction being along an X-axis that is one of three axes that are orthogonal to each other and are the X-axis, a Y-axis, and a Z-axis, and
a detection electrode provided on the substrate and disposed to face the movable body,
the detection electrode including a first detection electrode disposed to face the movable body, and a second detection electrode disposed to face the movable body,
a separation distance between the movable body and the second detection electrode is greater than a separation distance between the movable body and the first detection electrode,
vibration of the movable body has a drive vibration mode in which vibration parallel to the Z-axis and vibration parallel to the X-axis are combined, and
the detection electrode is divided into a first region and a second region by a straight line parallel to the Y-axis at a midpoint of the detection electrode in a direction parallel to the X-axis, and an area of the second detection electrode included in the first region is different from an area of the second detection electrode included in the second region, the method comprising:
adjusting an output signal by changing a pseudo inclination of the detection electrode with respect to the X-axis by selecting one of a first state in which the first detection electrode and the second detection electrode are electrically connected to each other and a second state in which the first detection electrode and the second detection electrode are not electrically connected.

* * * * *